United States Patent
Kim et al.

(10) Patent No.: US 12,480,244 B2
(45) Date of Patent: Nov. 25, 2025

(54) WASHING MACHINE, CONTROL METHOD THEREFOR AND CONTROL PANEL THEREFORE

(71) Applicant: Samsung Electronics Co., Ltd., Suwon-si (KR)

(72) Inventors: Seunghoon Kim, Suwon-si (KR); Junhyun Park, Suwon-si (KR); Sugkil Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 395 days.

(21) Appl. No.: 17/937,304

(22) Filed: Sep. 30, 2022

(65) Prior Publication Data
US 2023/0030827 A1 Feb. 2, 2023

Related U.S. Application Data

(63) Continuation of application No. PCT/KR2021/003767, filed on Mar. 26, 2021.

(30) Foreign Application Priority Data

Apr. 3, 2020 (KR) .................. 10-2020-0041198

(51) Int. Cl.
*D06F 33/40* (2020.01)
*D06F 33/48* (2020.01)
(Continued)

(52) U.S. Cl.
CPC ............ *D06F 37/304* (2013.01); *D06F 33/40* (2020.02); *D06F 33/48* (2020.02); *D06F 37/22* (2013.01);
(Continued)

(58) Field of Classification Search
None
See application file for complete search history.

(56) References Cited

U.S. PATENT DOCUMENTS 8,365,334 B2 2/2013 Bae et al.
8,679,198 B2 3/2014 Bae et al.
(Continued)

FOREIGN PATENT DOCUMENTS

JP 2004-350983 A 12/2004
JP 2005-204968 A 8/2005
(Continued)

OTHER PUBLICATIONS

JP 205204968A machine translation, Drum Type Washing Machine, Okazaki (Year: 2005).*
(Continued)

*Primary Examiner* — Cristi J Tate-Sims

(57) ABSTRACT

A washing machine includes a drum, a drum motor coupled to the drum; a driving circuit and a processor. The driving circuit is configured to supply a driving current to the drum motor so that the drum motor rotates. The processor is configured to control the driving circuit to accelerate the drum motor from the first rotational speed to a second rotational speed based on a gradient of the fluctuating magnitude of the driving current supplied to the drum motor while controlling the driving circuit to rotate the drum motor at a first rotational speed.

6 Claims, 20 Drawing Sheets

(51) Int. Cl.
*D06F 37/22* (2006.01)
*D06F 37/30* (2020.01)
*D06F 103/46* (2020.01)
*D06F 105/48* (2020.01)

(52) U.S. Cl.
CPC ...... *D06F 2103/46* (2020.02); *D06F 2105/48* (2020.02)

(56) References Cited

U.S. PATENT DOCUMENTS

| | | |
|---|---|---|
| 9,994,987 B2 | 6/2018 | Im et al. |
| 2003/0000262 A1 | 1/2003 | Bruce et al. |

FOREIGN PATENT DOCUMENTS

| | | |
|---|---|---|
| JP | 2010-246579 A | 11/2010 |
| KR | 10-2007-0053977 A | 5/2007 |
| KR | 10-0857784 B1 | 9/2008 |
| KR | 10-1158060 B1 | 6/2012 |
| KR | 10-1215446 B1 | 12/2012 |
| WO | 2011020820 A1 | 2/2011 |

OTHER PUBLICATIONS

JP 2005204968 A, Drum Type Washing Machine machine translation, Okazaki (Year: 2004).*

International Search Report and Written Opinion of the International Searching Authority dated Jul. 19, 2021, in connection with International Application No. PCT/KR2021/003767, 5 pages.

3GPP TS 23.501; "3rd Generation Partnership Project; Technical Specification Group Services and System Aspects; System architecture for the 5G System (5GS); Stage 2 (Release 16)", V16.13.0 (Jun. 2022), 454 pages.

Notice Requesting Submission of Opinion dated Aug. 1, 2025, in connection with Korean Application No. 10-2020-0041198, 13 pages.

* cited by examiner

WASHING MACHINE, CONTROL METHOD THEREFOR AND CONTROL PANEL THEREFORE

CROSS REFERENCES TO RELATED APPLICATIONS

This application is a Bypass Continuation of International Application No. PCT/KR2021/003767, filed Mar. 26, 2021, which claims priority to Korean Patent Application No. 10-2020-0041198, filed Apr. 3, 2020, the disclosures of which are herein incorporated by reference in their entirety.

BACKGROUND

1. Field

The disclosure relates to a washer for washing, rinsing and dehydrating clothes.

2. Description of Related Art

In general, a washer may include a tub and a drum rotationally installed in the tub and do laundry by rotating the drum containing clothes inside the tub. The washer may perform a washing course for washing the clothes, a rinsing course for rinsing the washed clothes, and a dehydrating course for dehydrating the clothes.

The dehydrating course in particular may separate water that has been soaked in the clothes from the clothes by rotating the drum containing the clothes at about 1000 revolutions per minute (rpm).

Accordingly, the drum spins fast during the dehydrating course, which may cause the tub accommodating the drum to vibrate. Especially, when the clothes are not evenly spread inside the drum (i.e., there is an unbalance of the clothes), eccentricity of the rotating drum may occur. The eccentricity of the drum further increases the vibration of the tub, and when an amplitude of the vibration of the tub is greater than a preset amplitude, the washer may terminate the dehydrating course.

As such, the unbalance of clothes inside the drum may cause termination of the dehydrating course of the washer, and the termination of the dehydration course may increase an operation time of the washer.

SUMMARY

To solve the aforementioned problem, the disclosure provides a washer and method for controlling the same, capable of reducing the unbalance of clothes during a dehydrating course.

According to an aspect of the disclosure, a washer includes a drum; a drum motor coupled to the drum; a driving circuit configured to supply a driving current to the drum motor to rotate the drum motor; and a controller electrically coupled to the driving circuit, wherein the controller is configured to control the driving circuit to accelerate the drum motor to a second rotation speed based on a gradient of a fluctuating magnitude of the driving current supplied to the drum motor while controlling the driving circuit to rotate the drum motor at a first rotation speed.

According to an aspect of the disclosure, a method of controlling a washer including a drum and a drum motor coupled to the drum, the method including: supplying a driving current to the drum motor to rotate the drum motor at a first rotation speed; obtaining a driving current to be supplied to the drum motor during the rotation of the drum motor at the first rotation speed; and accelerating the drum motor to a second rotation speed based on a gradient of a fluctuating magnitude of the driving current.

According to an aspect of the disclosure, a washer includes a drum; a drum motor coupled to the drum; a driving circuit configured to supply a driving current to the drum motor to rotate the drum motor; and a controller electrically coupled to the driving circuit and configured to control the driving circuit to rotate the drum motor at a first rotation speed and control the driving circuit for rotation at a second rotation speed, wherein the controller is configured to control the driving circuit to decelerate the drum motor to the first rotation speed based on a fluctuating magnitude of a driving current supplied to the drum motor equal to or greater than a reference fluctuating magnitude while controlling the driving circuit to rotate the drum motor at the second rotation speed.

According to the disclosure, a washer and method for controlling the same capable of reducing the unbalance of clothes during a dehydrating course may be provided. This may prevent termination of the dehydrating course due to the unbalance of the clothes and also reduce an operation time of the washer.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
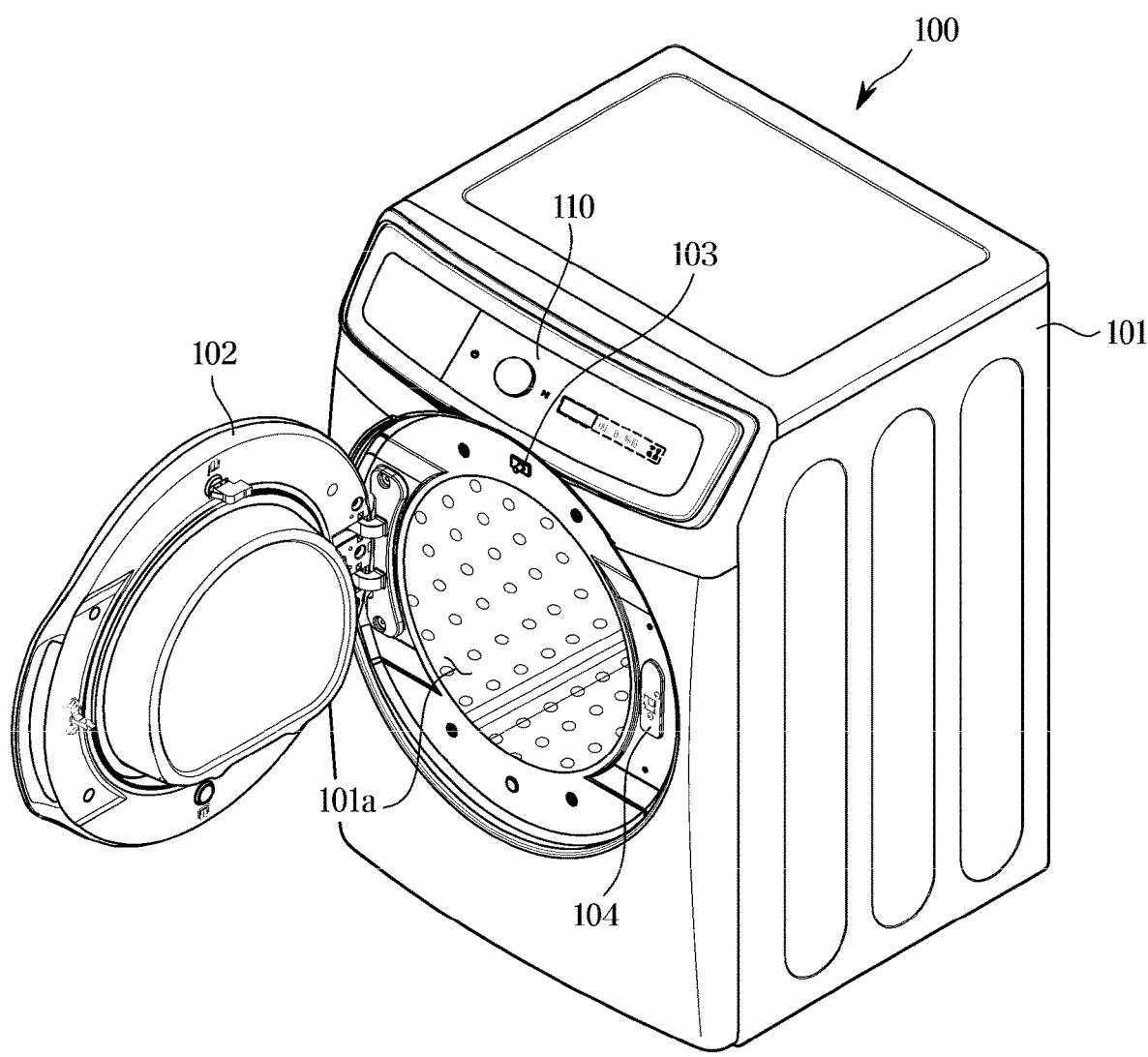
FIG. 1 illustrates an exterior view of a washer, according to an embodiment.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Like numerals refer to like elements throughout the specification. Not all elements of embodiments of the disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

Throughout the specification, when it is said that a member is located "on" another member, it implies not only that the member is located adjacent to the other member but also that a third member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the disclosure will now be described with reference to accompanying drawings.

Figure 2:
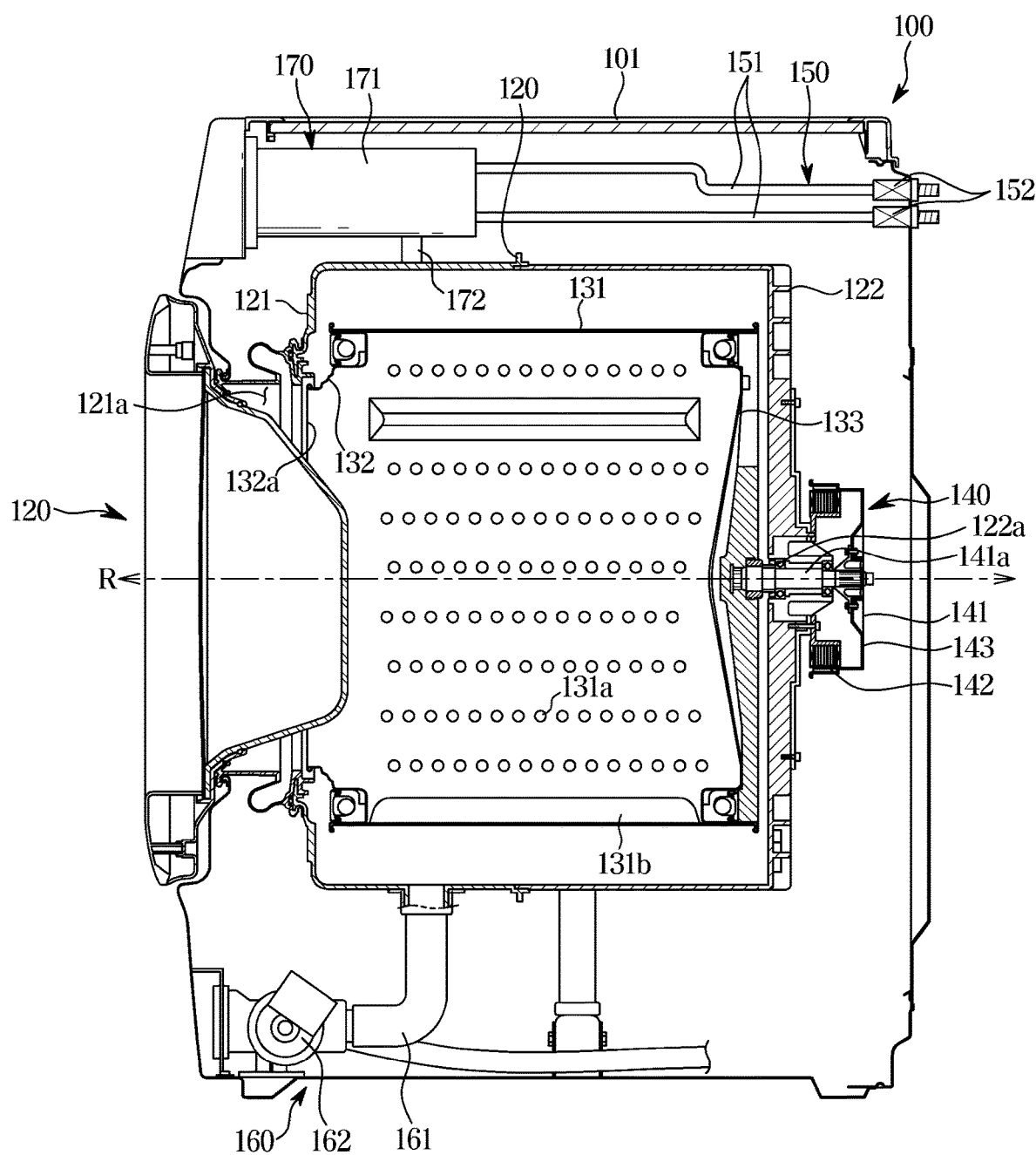
FIG. 2 illustrates a side cross-sectional view of a washer, according to an embodiment.

FIG. 1 illustrates an exterior view of a washer, according to an embodiment. FIG. 2 illustrates a side cross-sectional view of a washer, according to an embodiment.

FIGS. 1 and 2, describe a configuration of a washer 100.

The washer 100 includes a cabinet 101. The washer 100 further includes a door 102, a control panel 110, a tub 120, a drum 130, a driver 140, a water supplier 150, a drain 160, and a detergent supplier 170 received in the cabinet 101.

An inlet 101a is formed in the middle of the front side of the cabinet 101 to draw in or out clothes.

The door 102 is arranged at the inlet 101a. The door 102 is mounted on the cabinet 101 to pivot on a hinge.

The door 102 may open or close the inlet 101a, and that the inlet 101a is closed by the door 102 may be detected by a door switch 103. When the inlet 101a is closed and the washer 100 operates, the door 102 may be locked by a door lock 104.

The control panel 110 including a user input module for obtaining a user input for the washer 100 from the user and a display for displaying operation information of the washer 100 is arranged on an upper front portion of the cabinet 101. The control panel 110 will be described in more detail below.

The tub 120 may be arranged inside the cabinet 101 and may contain water for washing and/or rinsing.

The tub 120 includes tub front parts 121 with an opening 121a formed on the front and tub rear parts 122 in the shape of a cylinder with a closed rear side.

The opening 121a through which to draw in or out clothes to or from the drum 130 arranged in the tub 120 is formed on the front of the tub front parts 121. A bearing 122a is arranged on the rear wall of the tub rear parts 122 to rotationally fix a drum motor 141.

The drum 130 may be rotationally arranged in the tub 120 and may contain clothes to be washed.

The drum 130 includes a cylindrical drum body 131, drum front parts 132 arranged on the front of the drum body 131 and drum rear parts 133 arranged on the back of the drum body 131.

Formed on the inner surface of the drum body 131, are through holes 131a connecting the inside of the drum 130 to the inside of the tub 120 and a lifter 131b for lifting the clothes up the drum 130 during rotation of the drum 130. An opening 132a through which to draw in or out clothes to or from the drum 130 is formed on the drum front parts 132. The drum rear parts 133 may be coupled to a shaft 141a of the drum motor 141 that rotates the drum 130.

The driver 140 includes the drum motor 141 to rotate the drum 130.

The drum motor 141 is arranged on the outside of the tub rear parts 122 of the tub 120 and coupled to the drum rear parts 133 of the drum 130 through the shaft 141a. The shaft 141a penetrates the tub rear parts 122 and is rotationally supported by the bearing 122a arranged on the tub rear parts 122.

The drum motor 141 includes a stator 142 fixed on the outside of the tub rear parts 122 and a rotor 143 rotationally arranged and coupled to the shaft 141a. The rotor 143 may be rotated by magnetic interaction with the stator 142, and the rotation of the rotor 143 may be delivered to the drum 130 through the shaft 141a.

The drum motor 141 may include, for example, a brushless direct current motor (BLDC motor) or a permanent synchronous motor (PMSM) capable of easily controlling the rotation speed.

The water supplier 150 may supply water to the tub 120 and the drum 130.

The water supplier 150 includes a water supply conduit 151 coupled to an external water source to supply water to the tub 120, and a water supply valve 152 arranged at the water supply conduit 151.

The water supply conduit 151 may be arranged above the tub 120 and may extend to a detergent container 171 from the external water source. The water is guided to the tub 120 via the detergent container 171.

The water supply valve 152 may allow or block the supply of water to the tub 120 from the external water source in response to an electric signal. The water supply valve 152 may include, for example, a solenoid valve that is opened or closed in response to an electric signal.

The drain 160 may drain out the water stored in the tub 120 and/or the drum 130.

The drain 160 includes a drain conduit 161 arranged under the tub 120 to extend from the tub 120 to the outside of the cabinet 101, and a drain pump 162 arranged at the drain conduit 161. The drain pump 162 may pump the water in the drain conduit 161 to the outside.

The detergent supplier 170 may supply a detergent to the tub 120/drum 130.

The detergent supplier 170 is arranged above the tub 120 and includes the detergent container 171 and a mixing conduit 172 that connects the detergent container 171 to the tub 120.

The detergent container 171 may be coupled to the water supply conduit 151, and the water supplied through the water supply conduit 151 may be mixed with the detergent in the detergent container 171. The mixture of the detergent and the water may be supplied to the tub 120 through the mixing conduit 172.

Figure 3:
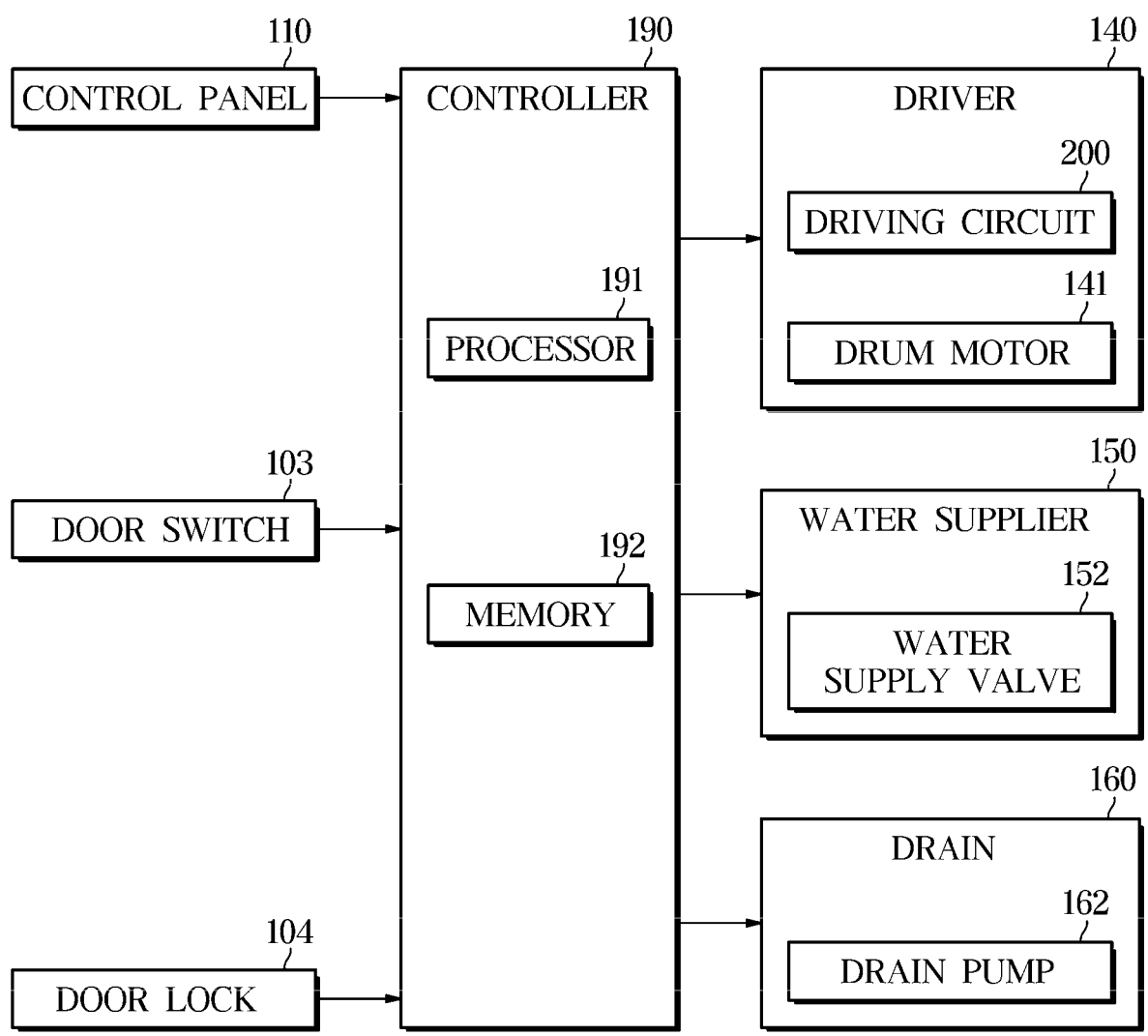
FIG. 3 illustrates a block diagram, according to an embodiment.
Figure 4:
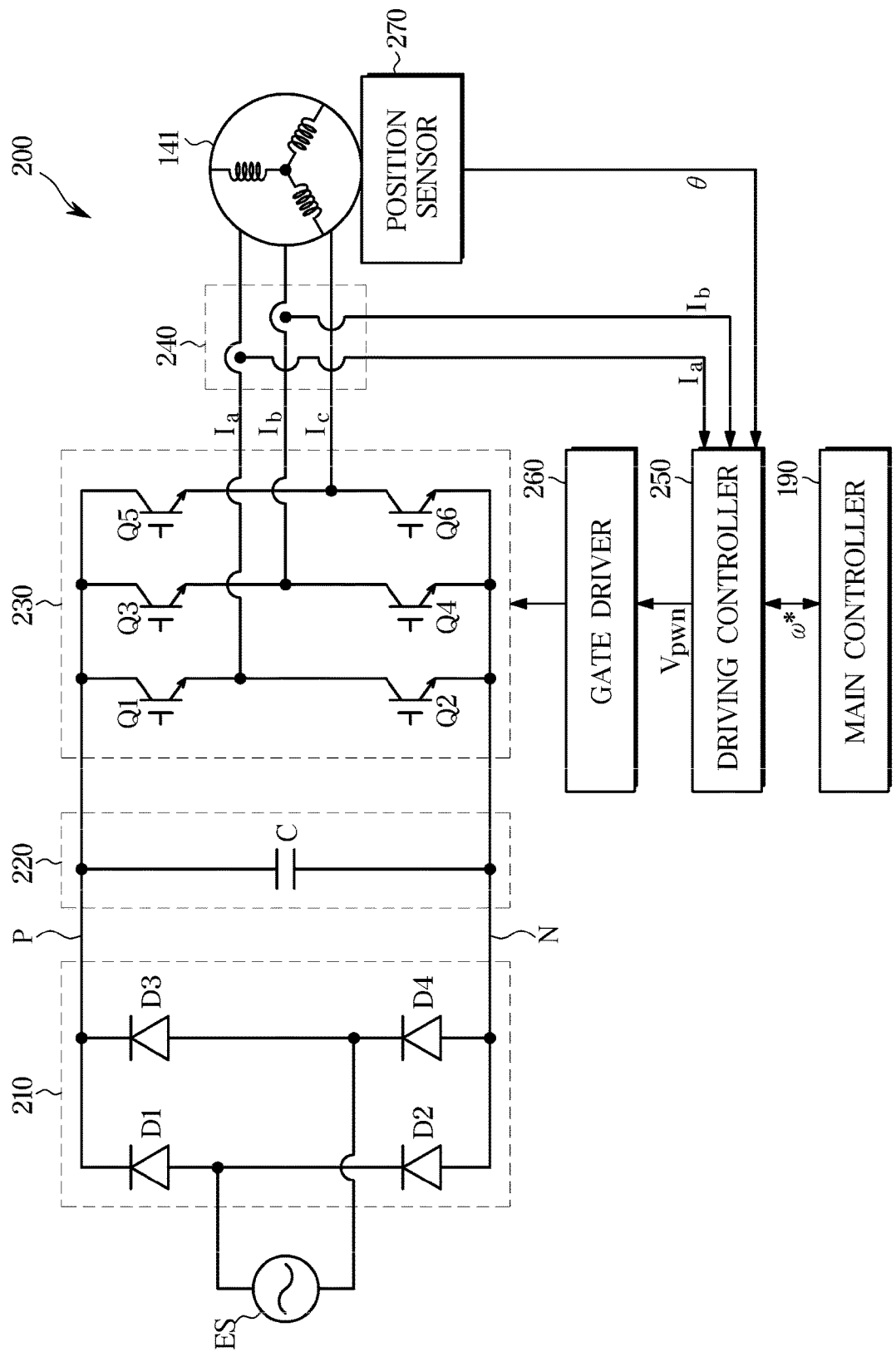
FIG. 4 illustrates an example of a driving circuit included in a washer, according to an embodiment.
Figure 5:
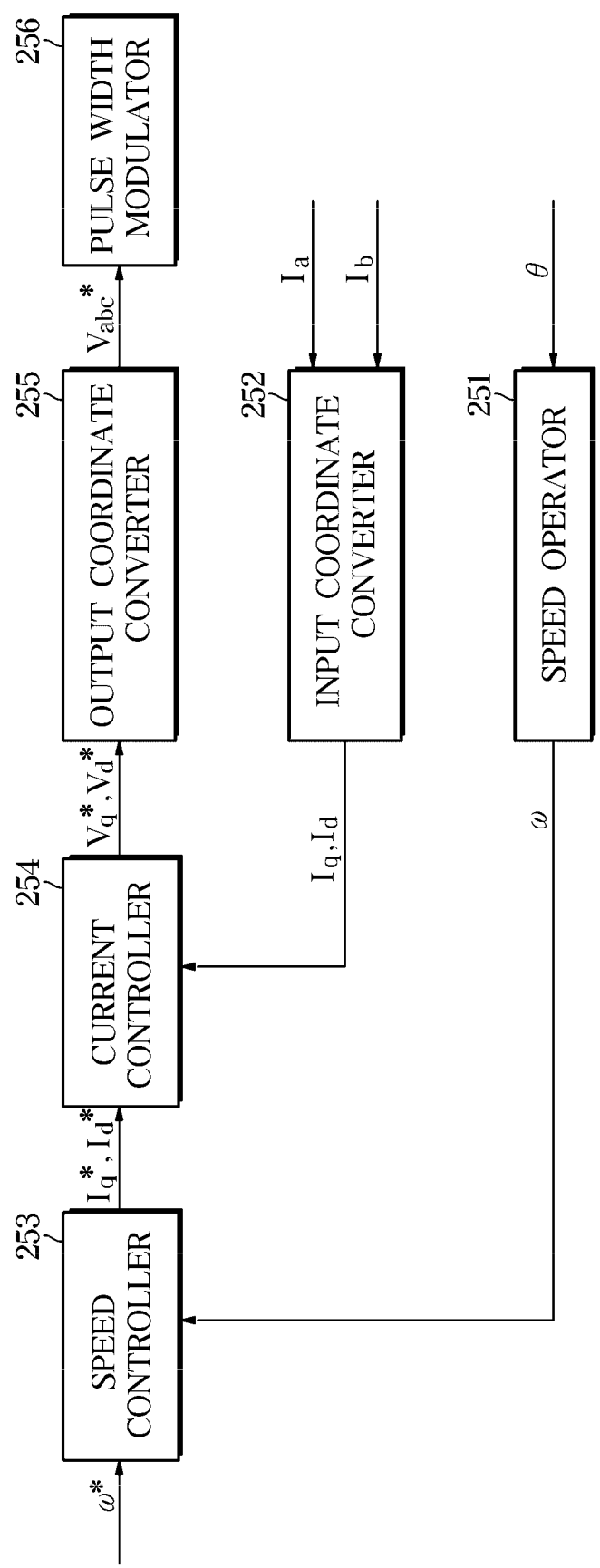
FIG. 5 illustrates an example of a controller included in a washer, according to an embodiment.

FIG. 3 illustrates a configuration of a washer, according to an embodiment. FIG. 4 illustrates an example of a driving circuit included in a washer, according to an embodiment. FIG. 5 illustrates an example of a controller included in a washer, according to an embodiment.

The washer 100 may include not only the mechanical components described in connection with FIGS. 1 and 2 but also electrical components as described below.

Referring to FIGS. 3, 4 and 5, the washer 100 includes the door switch 103, the door lock 104, the control panel 110, the driving circuit 200, the drum motor 141, the water supply valve 152, the drain pump 162 and a controller 190.

The door switch 103 may detect a closed state of the door 102 and an open state of the door 102. For example, the door switch 103 may be opened (turned off) in the open state of the door 102 and closed (turned on) in the closed state of the door 102. The door switch 103 may provide a signal indicating the closed state of the door 102 or a signal indicating the open state of the door 102.

The door lock 104 may lock the door 102 in response to a locking signal from the controller 190. For example, when the door 102 closes the inlet 101a and the washer 100 operates, the controller 190 may control the door lock 104 to lock the door 102.

The control panel 110 may include an input button for obtaining a user input, and a display for displaying a laundry setting and/or laundry operation information in response to the user input. In other words, the control panel 110 may provide an interface (hereinafter, referred to as a user interface) for interaction between the user and the washer 100.

The input button may include, for example, a power button, a start button, a course selection dial, and a detailed setting button. The input button may include, for example, a tact switch, a push switch, a slide switch, a toggle switch, a micro switch, or a touch switch.

The display includes a screen for displaying a laundry course selected by turning the course selection dial and an operation time of the washer 100, and an indicator for indicating detailed settings selected by the setting button. The display may include, for example, a liquid crystal display (LCD) panel, a light emitting diode (LED), or the like.

In this case, the laundry course may include laundry settings (e.g., washing temperature, the number of rinsing times, dehydration intensity, etc.) set in advance by a designer of the washer 100 based on the type of clothes (e.g., bedclothes, underwear, etc.) and texture (e.g., wool). For example, standard washing may include a laundry setting that may be applied to most clothes, and bedclothes washing may include a washing setting optimized for washing the bedclothes. The laundry course may be classified into, for example, standard washing, powerful washing, wool washing, bedclothes washing, infant clothes washing, towel washing, minimal washing, boiling washing, economic washing, outdoor clothes washing, rinsing/dehydrating, dehydrating, etc.

The driving circuit 200 may supply a driving current to the drum motor 141 for driving the drum motor 141, in response to a driving signal from the controller 190.

Figure 8:
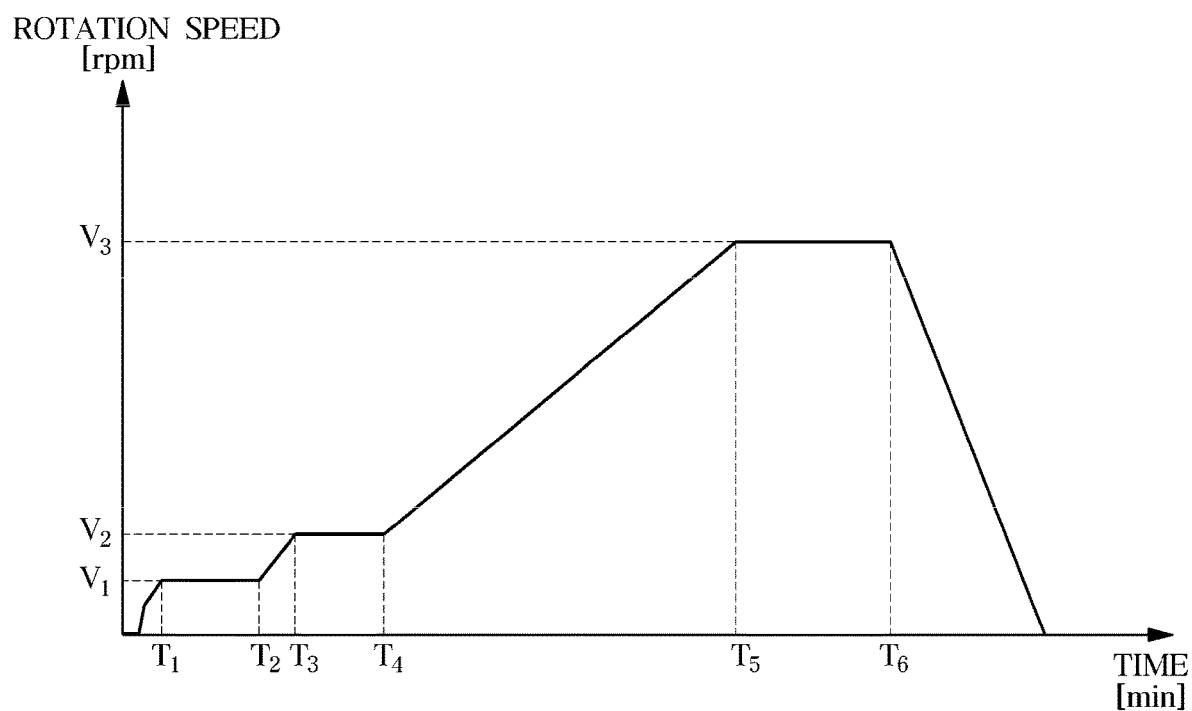
FIG. 8 illustrates rotation speed of a drum during dehydration of a washer, according to an embodiment.

As shown in FIG. 8, the driving circuit 200 may include a rectifying circuit 210 for rectifying alternate current (AC) power from an external power source ES, a direct current (DC) link circuit 220 for eliminating ripples of the rectified power and outputting DC power, an inverter circuit 230 for converting the DC power to sinusoidal driving power and outputting a driving current Iabc to the drum motor 141, a current sensor 240 for measuring the driving current Iabc supplied to the drum motor 141, a driving controller 250 for controlling driving power conversion of the inverter circuit 230, and a gate driver 260 for turning on or off switching circuits Q1, Q2, Q3, Q4, Q5 and Q6 included in the inverter circuit 230 based on a driving signal from the driving controller 250.

Furthermore, a position sensor 270 for measuring a position of the rotor 143 (an electric angle of the rotor) of the drum motor 141 may be provided on each drum motor 141.

The rectifying circuit 210 includes a diode bridge including a plurality of diodes, such as diodes D1, D2, D3 and D4. The diode bridge is arranged between a positive terminal P and a negative terminal N of the driving circuit 200. The rectifying circuit 210 may rectify the AC power (AC voltage and AC current) that changes in magnitude and direction over time to power having a constant direction.

The DC link circuit 220 includes a DC link capacitor C1 for storing electric energy. The DC link capacitor C1 is arranged between the positive terminal P and the negative terminal N of the driving circuit 200. The DC link circuit 220 may receive the power rectified by the rectifying circuit 210 and output DC power with a constant magnitude and direction.

The inverter circuit 230 may include three pairs of switching devices Q1 and Q2, Q3 and Q4, and Q5 and Q6 arranged between the positive terminal P and the negative terminal N of the driving circuit 200. The switching device pairs Q1 and Q2, Q3 and Q4 and Q5 and Q6 may each include two switching devices Q1 and Q2, Q3 and Q4 or Q5 and Q6 coupled in series. The switching devices Q1, Q2, Q3, Q4, Q5 and Q6 included in the inverter circuit 230 may be each turned on/off by an output of the gate driver 260, so that a 3-phase driving current Iabc may be supplied to the drum motor 141.

The current sensor 240 may measure the 3-phase driving current (a-phase current, b-phase current and c-phase current) output from the inverter circuit 230, and output data representing the measured 3-phase driving current values (Ia, Ib and Ic: Iabc) to the driving controller 250. Alternatively, the current sensor 240 may measure only 2-phase driving current among the 3-phase driving current Iabc, and the driving controller 250 may expect the other driving current from the two-phase driving current.

The position sensor 270 may be arranged on the drum motor 141 for measuring a position Θ of the rotor 143 (e.g., an electric angle of the rotor) of the drum motor 141 and outputting position data representing the electric angle Θ of the rotor 143. The position sensor 270 may be implemented by a hall sensor, an encoder, a resolver, or the like.

The gate driver 260 may output a gate signal to turn on/off the plurality of switching circuits Q1, Q2, Q3, Q4, Q5 and Q6 included in the inverter circuit 230 based on an output of the driving controller 250.

The driving controller 250 may be provided separately from the controller 190. The driving controller 250 may include an application specific integrated circuit (ASIC) for outputting a driving signal based on e.g., a rotation speed command ω*, the driving current value Iabc, and a position Θ of the rotor. Alternatively, the driving controller 250 may include a memory for storing a series of instructions for outputting a driving signal based on the rotation speed command ω*, the driving current value Iabc, and the rotor position Θ, and a processor for processing the series of instructions stored in the memory.

The driving controller 250 may be provided integrally with the controller 190. For example, the driving controller 250 may be implemented with a series of instructions for outputting a driving signal based on the rotation speed command ω*, the driving current value Iabc and the rotor position Θ stored in the memory 192 of the controller 190.

The driving controller 250 may receive a motor control signal (e.g., a rotation speed command) from the controller 190, receive the driving current value Iabc from the current sensor 240, and receive the rotor position Θ of the drum motor 141 from the position sensor 270. The driving controller 250 may determine a driving current value to be supplied to the drum motor 141 based on the rotation speed command ω*, the driving current value Iabc and the rotor position Θ, and output a driving signal (pulse width modulation (PWM) signal) for controlling the inverter circuit 230 based on the determined driving current value.

The driving controller 250 may include a speed operator 251, an input coordinate converter 252, a speed controller 253, a current controller 254, an output coordinate converter 255 and a pulse width modulator 256, as shown in FIG. 5.

The speed operator 251 may calculate a rotation speed value ω of the drum motor 141 based on the electric angle θ of the rotor of the drum motor 141. The electric angle θ of the rotor may be received from the position sensor 270 arranged on the drum motor 141. For example, the speed operator 251 may calculate the rotation speed value ω of the drum motor 141 based on a change in the electric angle θ of the rotor 143 for a sampling time interval.

When there is no position sensor 270 provided, the speed operator 251 may calculate the rotation speed value ω of the drum motor 141 based on the driving current value Iabc measured by the current sensor 240.

The input coordinate converter 252 may convert the 3-phase driving current value Iabc into a d-axis current value Id and a q-axis current value Iq (hereinafter, a d-axis current and a q-axis current) based on the electric angle θ of the rotor. In other words, the input coordinate converter 252 may perform axial conversion on the a-axis, the b-axis, and the c-axis of the 3-phase driving current value Iabc into the d-axis and the q-axis. In this case, the d-axis refers to an axis in a direction corresponding to a direction of a magnetic field produced by the rotor of the drum motor 141, and the q-axis refers to an axis in a direction ahead by 90 degrees of a direction of the magnetic field produced by the rotor of the drum motor 141. The 90 degrees refer to an electric angle rather than a mechanical angle of the rotor, and the electric angle refers to a converted angle according to which an angle between neighboring N poles or neighboring S poles of the rotor is converted into 360 degrees.

Furthermore, the d-axis current may represent a current component of the driving current, which produces a magnetic field in the d-axis direction, and the q-axis current may represent a current component of the driving current, which produces a magnetic field in the q-axis direction.

The input coordinate converter 252 may calculate the q-axis current value Iq and the d-axis current value Id from the 3-phase driving current value Iabc based on Equation (1), below.

$$\begin{bmatrix} I_d \\ I_q \end{bmatrix} = \begin{bmatrix} \cos\theta & \sin\theta \\ -\sin\theta & \cos\theta \end{bmatrix} \begin{bmatrix} 1 & -1/2 & -1/2 \\ 0 & 1/\sqrt{3} & -1/\sqrt{3} \end{bmatrix} \begin{bmatrix} I_a \\ I_b \\ I_c \end{bmatrix} \quad (1)$$

Here, Id is the d-axis current value, Iq is the q-axis current value, θ is an electric angle of the rotor, Ia is an a-phase current value, Ib is a b-phase current value, and Ic is a c-phase current value.

The speed controller 253 may compare the rotation speed command ω* from the controller 190 with the rotation speed value ω of the drum motor 141, and output a q-axis current command Iq* and a d-axis current command Id* based on a result of the comparing. For example, the speed controller 253 may use proportional integral control (PI control) to calculate the q-axis current command Iq* and the d-axis current command Id* to be supplied to the drum motor 141 based on a difference between the rotation speed command ω* and the rotation speed value ω.

The current controller 254 may compare the q-axis current command Iq* and the d-axis current command Id* output from the speed controller 253 with the q-axis current value Iq and the d-axis current value Id output from the input coordinate converter 252, and output a q-axis voltage command Vq* and a d-axis voltage command Vd* based on a result of the comparing. Specifically, the current controller 254 may use PI control to determine the q-axis voltage command Vq* based on a difference between the q-axis current command Iq* and the q-axis current value Iq and determine the d-axis voltage command Vd* based on a difference between the d-axis current command Id* and the d-axis current value Id.

The output coordinate converter 255 may convert a dq-axis voltage command Vdq* into 3-phase voltage commands (an a-phase voltage command, a b-phase voltage command, and a c-phase voltage command) Vabc* based on the electric angle Θ of the rotor of the drum motor 141.

The output coordinate converter 255 may convert the dq-axis voltage command Vdq* to the 3-phase voltage command Vabc* as described in Equation (2), below.

$$\begin{bmatrix} V_a \\ V_b \\ V_c \end{bmatrix} = \begin{bmatrix} 1 & 0 \\ -1/2 & \sqrt{3}/2 \\ -1/2 & -\sqrt{3}/2 \end{bmatrix} \begin{bmatrix} \cos\theta & \sin\theta \\ -\sin\theta & \cos\theta \end{bmatrix} \begin{bmatrix} V_d \\ V_q \end{bmatrix} \quad (2)$$

Here, Va is an a-phase voltage command, Vb is a b-phase voltage command, Vc is a c-phase voltage command, θ is an electric angle of the rotor, Vd is the d-axis voltage command, and Vq is the q-axis voltage command.

The pulse width modulator 256 may generate a PWM control signal Vpwm to turn on or turn off the switching circuits Q1, Q2, Q3, Q4, Q5 and Q6 of the inverter circuit 230 from the 3-phase voltage command Vabc*. Specifically, the pulse width modulator 256 may perform PWM on the 3-phase voltage command Vabc* and output a PWMed PWM signal Vpwm to the gate driver 260.

As such, the driving controller 250 may output a driving signal (PWM signal) to the gate driver 260 based on a motor control signal (e.g., a rotation speed command) from the controller 190. Furthermore, the driving controller 250 may provide the driving current value Iabc, the dq-axis current value Idq and the dq-axis current command Idq* to the controller 190.

As described above, the driving circuit 200 may supply a driving current to the drum motor 141 based on the motor control signal (e.g., the rotation speed command) from the controller 190.

The drum motor 141 may rotate the drum 130 depending on the driving current from the driving circuit 200. For example, the drum motor 141 may receive a reference speed from the controller 190, and rotate the drum 130 so that the rotation speed of the drum 130 follows the reference speed from the controller 190.

The water supply valve 152 may remain in the closed state in ordinary times, and may be opened in response to a water supply signal from the controller 190. As the water supply valve 152 is opened, water may be supplied into the tub 120 through the water supply conduit 151.

The drain pump 162 may pump the water in the drain conduit 161 out of the cabinet 101 in response to a drain signal from the controller 190. By the pumping of the drain pump 162, the water stored in the tub 120 may be discharged out of the cabinet 101 through the drain conduit 161.

For example, the controller 190 may be mounted on a printed circuit board provided on the rear surface of the control panel 110.

The controller 190 may be electrically coupled to the door switch 103, the door lock 104, the control panel 110, the driving circuit 200, the drum motor 141, the water supply valve 152, and the drain pump 162.

The controller 190 may include a processor 191 for generating a control signal to control operation of the washer 100, and a memory 192 for memorizing or storing a program and data for generating the control signal to control the operation of the washer 100. The processor 191 and the memory 192 may be implemented with separate semiconductor devices or in a single semiconductor device. Furthermore, the controller 190 may include a plurality of processors or a plurality of memories.

The processor 191 may process data and/or a signal based on the program provided from the memory 192, and provide a control signal to each component of the washer 100 based on the processing result.

The processor 191 may receive a user input from the control panel 110 and process the user input.

The processor 191 may output the control signal to control the drum motor 141, the water supply valve 152, the drain pump 162 and the door lock in response to the user input. For example, the processor 191 may control the drum motor 141, the water supply valve 152, the drain pump 162 and the door lock to sequentially perform a washing course, a rinsing course and a dehydrating course. Furthermore, the processor 191 may output a control signal to control the control panel 110 to display a laundry setting and laundry operation information in response to the user input.

In certain embodiments, the processor 191 may output a motor control signal to the driving circuit 200 to rotate the drum motor 141 at high speed during the dehydrating course of the washer 100. During the dehydrating course of the washer 100, the processor 191 may receive information about a driving current (e.g., the d-axis current value, the q-axis current value, the d-axis current command, the q-axis current command, etc.) of the drum motor 141 from the driving circuit 200, and output a motor control signal to the driving circuit 200 to control rotation speed of the drum motor 141 based on the driving current of the drum motor 141.

For example, the processor 191 may output a motor control signal to the driving circuit 200 for rotation at first reference speed preset depending on the washer 100, and output a motor control signal to the driving circuit 200 to increase the rotation speed of the drum motor 141 based on a change in driving current to the drum motor 141 while the drum motor 141 is rotated at the first reference speed. Furthermore, the processor 191 may output a motor control signal to the driving circuit 200 for rotation at second reference speed preset depending on the washer 100, and output a motor control signal to the driving circuit 200 to reduce the rotation speed of the drum motor 141 based on a change in driving current to the drum motor 141 while the drum motor 141 is rotated at the first reference speed.

The processor 191 may include an operation circuit, a storage circuit, and a control circuit. The processor 191 may include one or multiple chips. Furthermore, the processor 191 may include one or multiple cores.

The memory 192 may memorize/store a program for controlling a laundry operation according to a laundry course and data including a laundry setting according to the laundry course. Furthermore, the memory 192 may memorize/store a laundry course and a laundry setting currently selected based on a user input.

The memory 192 may include a volatile memory, such as a static random access memory (S-RAM), a dynamic RAM (D-RAM), or the like, and a non-volatile memory, such as a read only memory (ROM), an erasable programmable ROM (EPROM) or the like. The memory 192 may include a memory device, or multiple memory devices.

As described above, the washer 100 may increase or decrease the rotation speed of the drum motor 141 based on a change in driving current (e.g., the q-axis current value or the q-axis current command) of the drum motor 141 during the dehydrating course.

Figure 6:
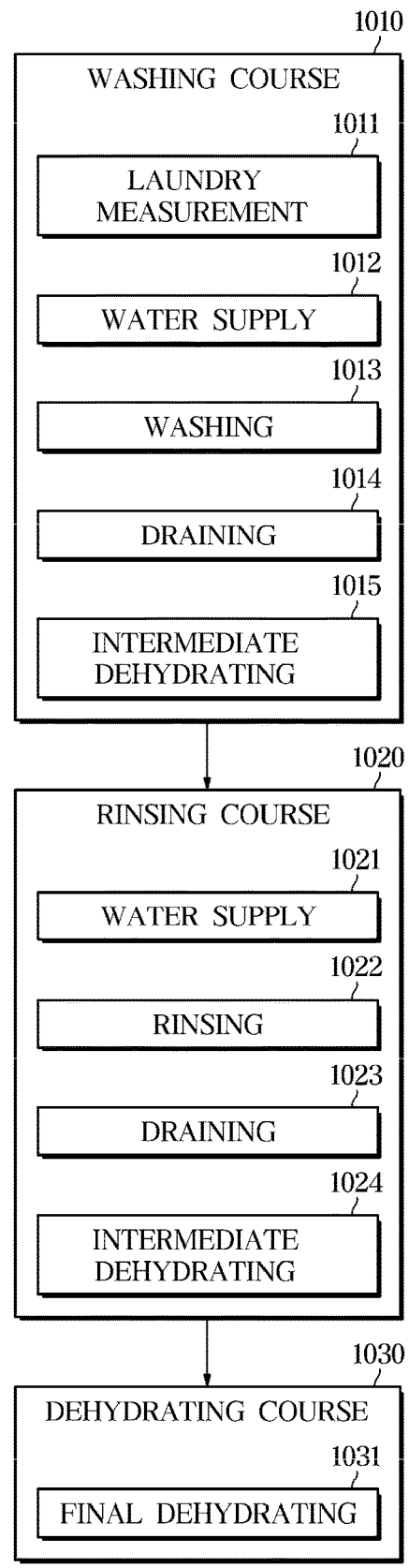
FIG. 6 illustrates an example of an operation of a washer, according to an embodiment.

FIG. 6 illustrates an example of an operation of a washer, according to an embodiment.

Referring to FIG. 6, the washer 100 may perform a washing course 1010, a rinsing course 1020 and a dehydrating course 1030 sequentially according to a user input.

Clothes may be washed by the washing course 1010. Specifically, dirt on the clothes may be separated by chemical actions of a detergent and/or mechanical actions such as falling.

The washing course 1010 may include laundry measurement 1011 for measuring an amount of clothes, water supply for supplying water into the tub 120, washing 1013 for washing the clothes by rotating the drum 130 at low speed, draining 1014 for draining water contained in the tub 120, and intermediate dehydrating 1015 for separating water from the clothes by rotating the drum 130 at high speed.

For the washing 1013, the controller 190 may control the driving circuit 200 to rotate the drum motor 141 in forward direction or reverse direction. Due to the rotation of the drum 130, the clothes may be washed by falling down the drum 130.

For the intermediate dehydrating 1015, the controller 190 may control the driving circuit 200 to rotate the drum motor 141 at high speed. Due to the high-speed rotation of the drum 130, water may be separated from the clothes contained in the drum 130 and drained out of the washer 100.

The rotation speed of the drum 130 may gradually increase during the intermediate dehydrating 1015. For example, the controller 190 may control the driving circuit 200 to rotate the drum motor 141 at a first rotation speed, and control the drum motor 141 so that the rotation speed of the drum motor 141 increases to a second rotation speed based on a change in driving current to the drum motor 141 while the drum motor 141 is rotating at the first rotation speed. The controller 190 may control the drum motor 141 so that the rotation speed of the drum motor 141 increases to a third rotation speed or the rotation speed of the drum motor 141 decreases to the first rotation speed based on a change in driving current to the drum motor 141 while the drum motor 141 is rotating at the first rotation speed.

The clothes may be rinsed by the rinsing course 1020. Specifically, the remnants of the detergent or dirt on the clothes may be washed by water.

The rinsing course 1020 may include water supply 1021 for supplying water into the tub 120, rinsing 1022 for rinsing the clothes by driving the drum 130, draining 1023 for draining water contained in the tub 120, and intermediate dehydrating 1024 for separating water from the clothes by driving the drum 130.

The water supply 1021, draining 1023 and intermediate dehydrating 1024 of the rinsing course 1020 may correspond to the water supply 1012, draining 1014 and intermediate dehydrating 1015 of the washing course 1010. During the rinsing course 1020, the water supply 1021, the rinsing 1022, the draining 1023 and the intermediate dehydrating 1024 may be performed one or multiple times.

The clothes may be dehydrated by the dehydrating course 1030. Specifically, water may be separated from the clothes by high-speed rotation of the drum 130, and the separated water may be discharged out of the washer 100.

The dehydrating course 1030 may include final dehydrating 1031 to separate water from the clothes by rotating the drum 130 at high speed. With the final dehydrating 1031, the last intermediate dehydrating 1024 of the rinsing course 1020 may be skipped.

For the final dehydrating 1031, the controller 190 may control the driving circuit 200 to rotate the drum motor 141 at high speed. Due to the high-speed rotation of the drum 130, water may be separated from the clothes contained in the drum 130 and drained out of the washer 100. The rotation speed of the drum motor 141 may gradually increase.

As the operation of the washer 100 is finished with the final dehydrating 1031, a performance time of the final dehydrating 1031 may be longer than a performance time of the intermediate dehydrating 1015 or 1024.

As described above, the washer 100 may perform the washing course 1010, the rinsing course 1020 and the dehydrating course 1030 to do the laundry. During the intermediate dehydrating 1015 and 1024 and the final dehydrating 1031 in particular, the washer 100 may gradually increase the rotation speed of the drum motor 141 for rotating the drum 130, and increase or decrease the rotation speed of the drum motor 141 based on a change in driving current to the drum motor 141.

Figure 7:
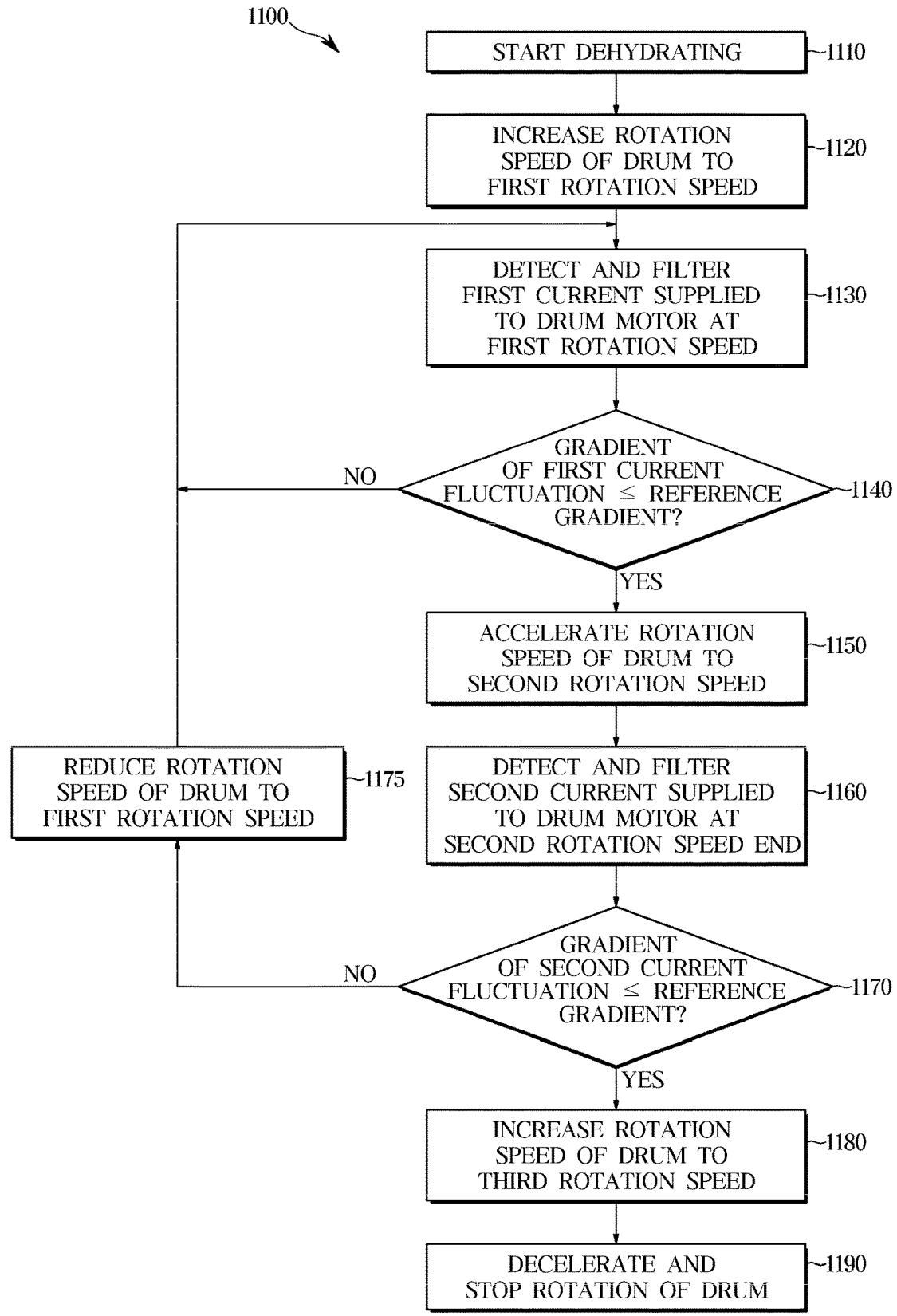
FIG. 7 illustrates an example of a dehydrating operation of a washer, according to an embodiment.
Figure 9A:
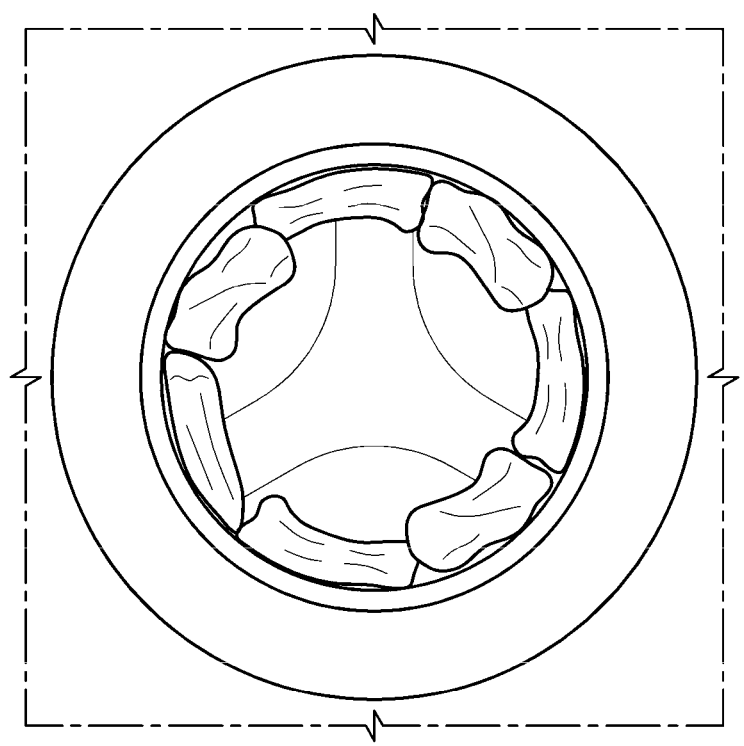
FIGS. 9A and 9B illustrate motions of clothes while a drum is rotated at a first rotation speed during dehydration of a washer, according to an embodiment.
Figure 9B:
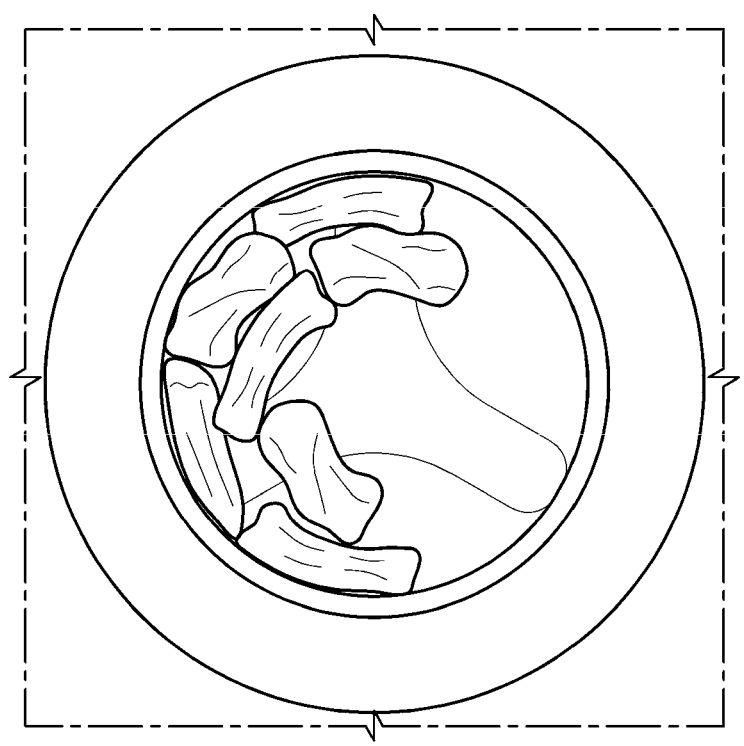
Figure 10:
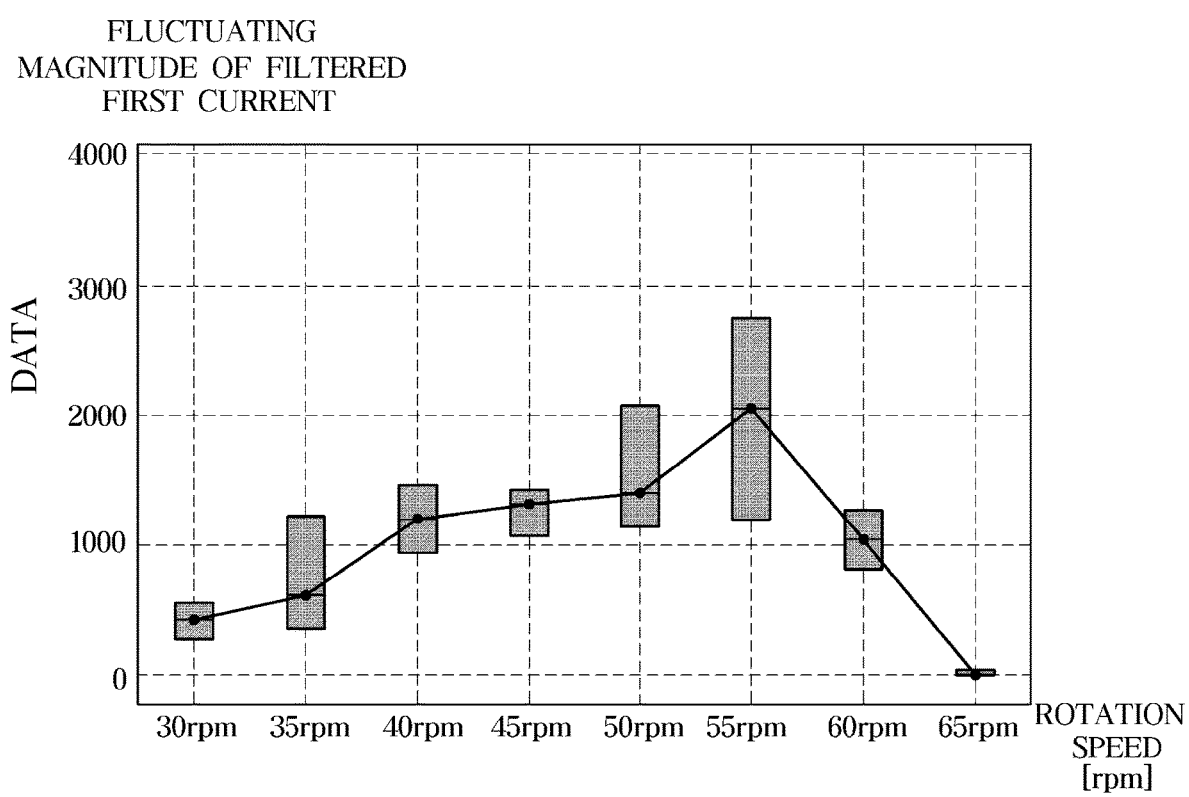
FIG. 10 illustrates fluctuations in driving current of a drum motor depending on rotation speed of a drum during dehydration of a washer, according to an embodiment.
Figure 11:
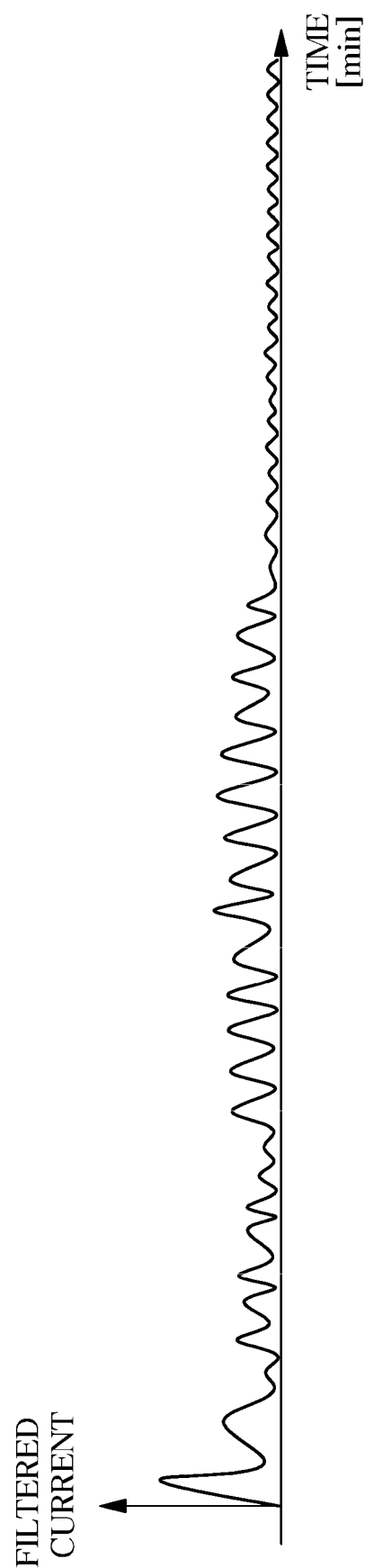
FIG. 11 illustrates an absolute value of filtered driving current of a drum motor during dehydration of a washer, according to an embodiment.
Figure 12:
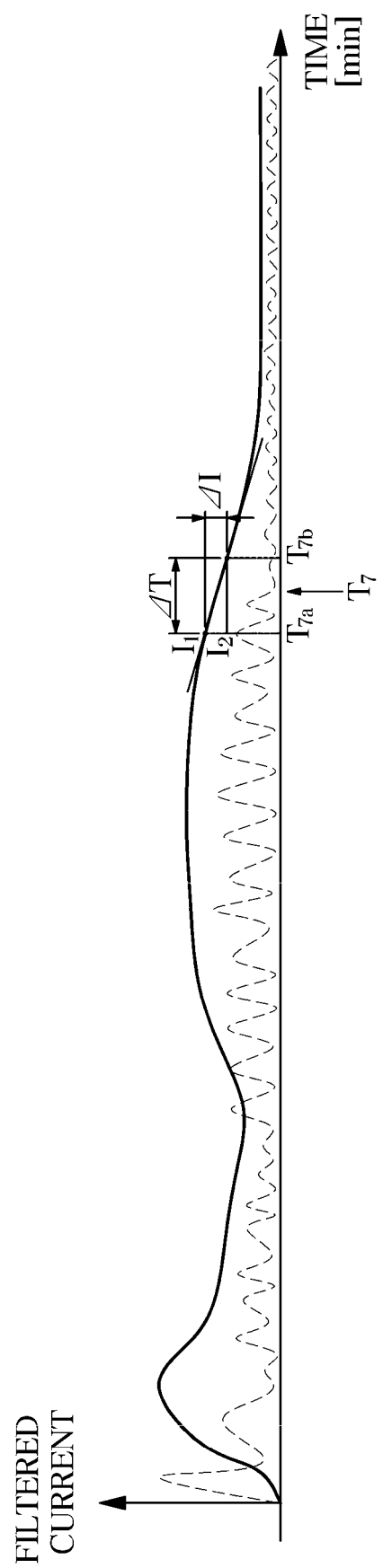
FIG. 12 illustrates filtered driving current of a drum motor during dehydration of a washer, according to an embodiment.
Figure 13:
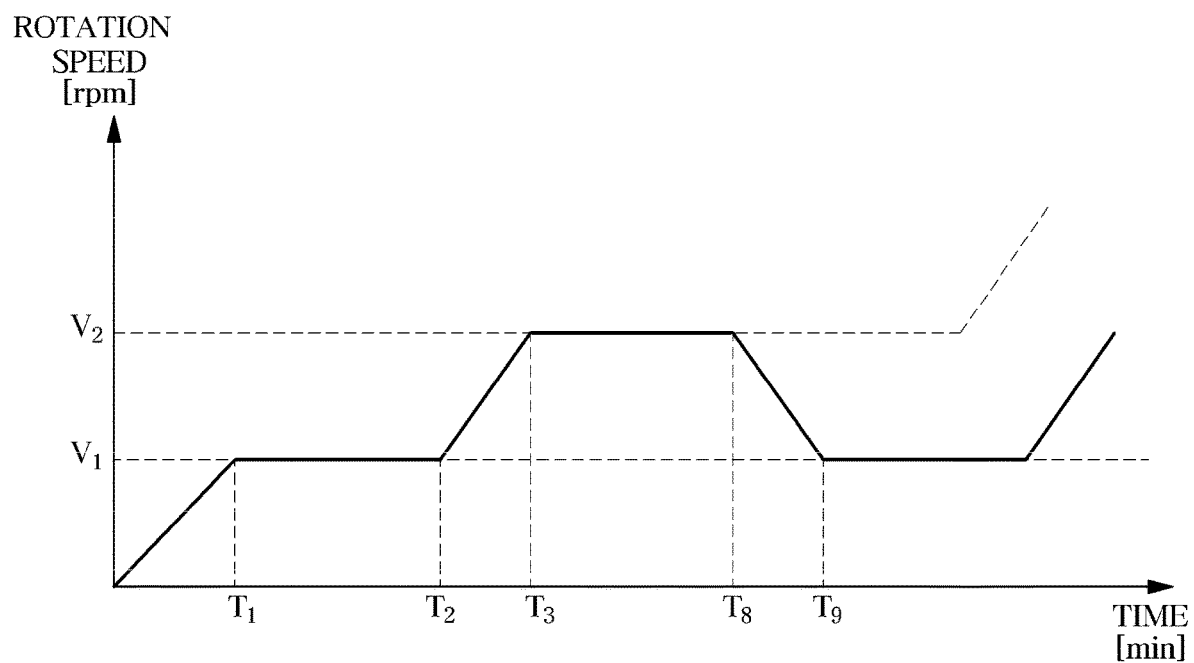
FIG. 13 illustrates changes in rotation speed of a drum during dehydration of a washer, according to an embodiment.
Figure 14:
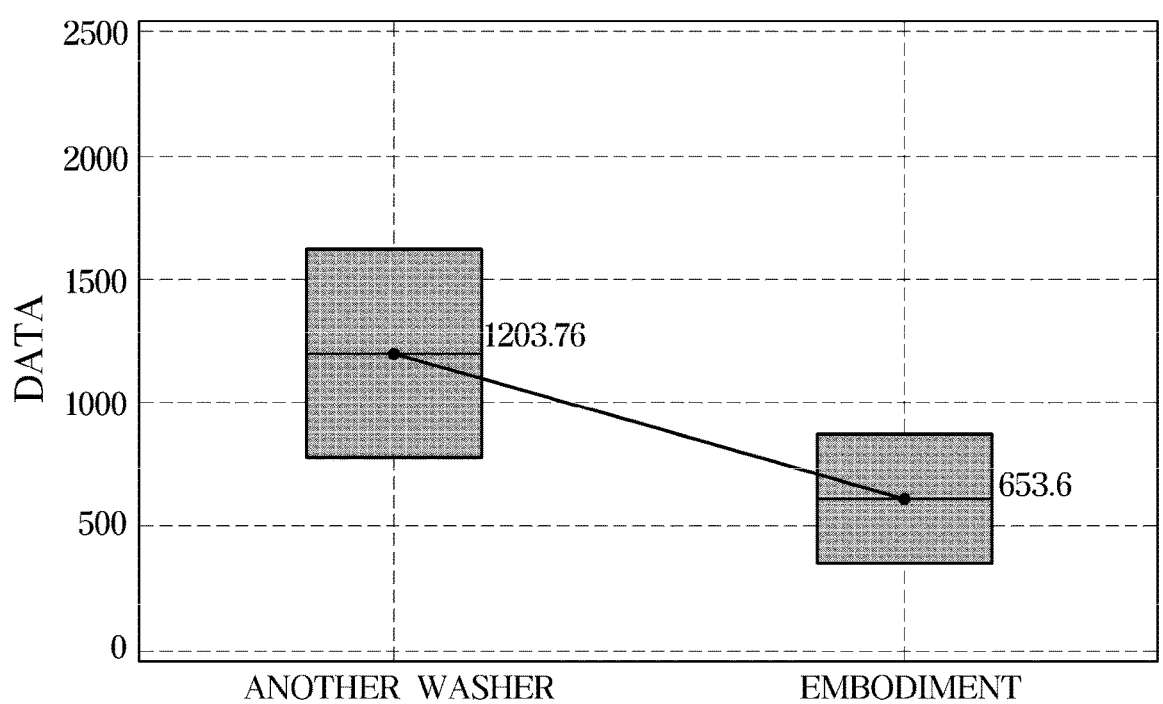
FIG. 14 illustrates fluctuations in driving current of a washer according to an embodiment.

FIG. 7 illustrates an example of a dehydrating operation of a washer, according to an embodiment. FIG. 8 illustrates rotation speed of a drum during dehydration of a washer, according to an embodiment. FIGS. 9A and 9B illustrate movement of clothes while a drum is rotated at a first rotation speed during dehydration of a washer, according to an embodiment. FIG. 10 illustrates fluctuations in driving current of a drum motor depending on rotation speed of a drum during dehydration of a washer, according to an embodiment. FIG. 11 illustrates an absolute value of filtered driving current of a drum motor during dehydration of a washer, according to an embodiment. FIG. 12 illustrates filtered driving current of a drum motor during dehydration of a washer, according to an embodiment. FIG. 13 illustrates changes in rotation speed of a drum during dehydration of a washer, according to an embodiment. FIG. 14 illustrates fluctuations in driving current of a washer according to an embodiment.

In connection with FIGS. 7-14, a dehydrating operation 1100 of the washer 100 is described.

The dehydrating operation 1100 may include the intermediate dehydrating 1015 and 1024 and the final dehydrating 1031 as described above in connection with FIG. 6.

The washer 100 starts dehydrating, in 1110.

For example, the controller 190 may control the drain pump 162 to drain the water contained in the tub 120 after the washing 1013 or the rinsing 1022. The controller 190 may determine whether the water contained in the tub 120 has been drained entirely based on an output from a water level sensor, and start dehydrating in response to the water contained in the tub 120 having been entirely drained.

The controller 190 may control the driving circuit 200 to rotate the drum motor 141 to dehydrate clothes contained in the drum 130.

The washer 100 increases the rotation speed of the drum 130 to a first rotation speed V1, in 1120.

To reduce an unbalance of clothes in the drum 130, the controller 190 may control the driving circuit 200 to increase the rotation speed of the drum motor 141 to the first rotation speed V1. In response to the rotation speed of the drum motor 141 reaching the first rotation speed V1, the controller 190 may control the driving circuit 200 to maintain the rotation speed of the drum motor 141 at the first rotation speed V1.

Under the control of the controller 190, the rotation speed of the drum motor 141 and the drum 130 may increase as shown in FIG. 8. Furthermore, the rotation speed of the drum motor 141 and the drum 130 may reach the first rotation speed V1 at time T1 and then stay at the first rotation speed V1.

The first rotation speed V1 may be set based on the motion of clothes inside the drum 130 while the drum 130 is rotated.

It is known that the higher the rotation speed of the drum 130, the stronger the centrifugal force applied to the clothes inside the drum 130. Due to an increase in centrifugal force applied to the clothes, the clothes may beat the gravity and may be laid along the inner wall of the drum 130, and the motion of the clothes may be reduced. In other words, the clothes may be stuck to the inner wall of the drum 130 and may be rotated along with the inner wall of the drum 130, as shown in FIG. 9A.

Furthermore, the lower the rotation speed of the drum 130, the weaker the centrifugal force applied to the clothes inside the drum 130. Due to the reduction of the centrifugal force applied to the clothes, the gravity portion may increase among forces applied to the clothes. This may cause the clothes to be laid in a lower portion of the drum 130 as shown in FIG. 9B. Specifically, the laundry may roll over along the inner and lower surface of the drum 130 due to the rotation of the drum 130.

As such, when the drum 130 is rotated at high speed, the clothes may be rotated along with the drum 130 while stuck to the inner wall of the drum 130, as shown in FIG. 9A. Moreover, when the drum 130 is rotated at low speed, the clothes may roll over along the inner surface of the drum 130 in the lower portion of the drum 130, as shown in FIG. 9B.

When the drum 130 is rotated at a "suitable" rotation speed, rotation of the clothes along with the drum 130 while the clothes are stuck to the inner wall of the drum 130 and rolling of the clothes along the inner surface of the drum 130 in the lower portion of the drum 130 may be alternately performed. In other words, when the drum 130 is rotated at a "suitable" rotation speed, the clothes may be rotated along with the drum 130 while stuck to the inner wall of the drum 130 in a cycle and may roll over along the inner surface of the drum 130 in the lower portion of the drum 130 in the next cycle.

The "suitable" rotation speed may be determined not only from the motion of clothes inside the drum 130 but also from fluctuations in driving current supplied to the drum motor 141 to rotate the drum 130.

For example, while the drum 130 is rotated at low speed, the clothes may roll over in the lower portion of the drum 130. Due to the rolling of the clothes in the lower portion of the drum 130, vibration of the drum 130 may occur, which may fluctuate the rotation speed of the drum 130 and the drum motor 141.

While the rotation speed of the drum motor 141 fluctuates, the driving current to be supplied to the drum motor 141 may be changed for the rotation speed of the drum motor 141 to follow the rotation speed command $\omega^*$ from the controller 190. Specifically, the driving circuit 200 may change the q-axis current related to torque of the drum motor 141. For example, the driving circuit 200 may increase the q-axis current command $Iq^*$ supplied to the drum motor 141 when the detected rotation speed of the drum motor 141 is lower than the rotation speed command $\omega^*$ of the controller 190, and decrease the q-axis current command $Iq^*$ supplied to the drum motor 141 when the detected rotation speed of the drum motor 141 exceeds the rotation speed command $\omega^*$ of the controller 190.

As such, a fluctuating magnitude of the q-axis current command $Iq^*$ of the driving circuit 200 may increase with an increase in fluctuating magnitude of the rotation speed of the drum 130 and the drum motor 141, and the fluctuating magnitude of the q-axis current command $Iq^*$ of the driving circuit 200 may decrease with a decrease in fluctuating magnitude of the rotation speed of the drum 130 and the drum motor 141.

When the drum motor 141 is rotated at high speed, the clothes may be rotated along with the drum 130 while stuck to the inner wall of the drum 130. Due to the rotation of the clothes along with the drum 130, vibration of the drum 130 is small and fluctuations in load of the drum motor 141 is also relatively small. Because the fluctuations in load of the drum motor 141 is small, fluctuations in the driving current supplied to the drum motor 141 from the driving circuit 200, i.e., the q-axis current command $Iq^*$, may be relatively small.

Referring to FIG. 10 which illustrates fluctuations in the q-axis current command $Iq^*$ of the driving circuit 200, it is seen that fluctuations in the q-axis current command $Iq^*$ of the driving circuit 200 stay very small while the drum motor 141 is rotating at e.g., about 65 rpm.

When the drum motor 141 is rotated at low speed, the clothes may roll over along the inner wall of the drum 130 in the lower portion of the drum 130. Due to the rolling of the clothes in the lower portion of the drum 130, vibration of the drum 130 may occur to a certain extent and fluctuations in load of the drum motor 141 also occur. Because of the fluctuations in load of the drum motor 141, fluctuations in the q-axis current command $Iq^*$ of the driving circuit 200 may become larger than the q-axis current command $Iq^*$ when the drum motor 141 is rotated at high speed.

Referring to FIG. 10, fluctuations in the q-axis current command $Iq^*$ while the drum motor 141 is rotating at e.g., about 30 rpm are larger than fluctuations in the q-axis current command $Iq^*$ while the drum motor 141 is rotating at about 65 rpm.

Furthermore, fluctuations in the q-axis current command $Iq^*$ while the drum motor 141 is rotating at e.g., about 30 rpm are larger than fluctuations in the q-axis current command Iq* while the drum motor 141 is rotating at about 30 rpm. As such, in a low-speed rotation region of the drum motor 141, the higher the rotation speed of the drum motor 141 the larger the fluctuations in the q-axis current Iq* of the driving circuit 200.

This is because motions of the clothes increase in a lower portion of the drum 130 as the rotation speed of the drum motor 141 increases. Specifically, centrifugal force applied to the clothes increases with the increase in rotation speed of the drum motor 141, and the increase in centrifugal force may cause the clothes to be lifted along the inner wall of the drum 130 and after this, gravity may cause the clothes to fall to the lower portion of the drum 130. As the rotation speed of the drum motor 141 increases, the clothes may be lifted higher along the inner wall of the drum 130 and the impact of falling on the clothes may increase accordingly. This may further increase fluctuations in load of the drum motor 141 and fluctuations in the q-axis current command Iq* of the driving circuit 200 may increase accordingly.

Furthermore, referring to FIG. 10, it is seen that fluctuations in the q-axis current command Iq* while the drum motor 141 is rotating at about 55 rpm increases rapidly as compared to fluctuations in the q-axis current command Iq* while the drum motor 141 is rotating at about 50 rpm.

As described above, when the drum 130 is rotated at a "suitable" rotation speed, rotation of the clothes along with the drum 130 while the clothes are stuck to the inner wall of the drum 130 and rolling of the clothes along the inner surface of the drum 130 in the lower portion of the drum 130 may be alternately performed.

When the drum 130 is rotated at the "suitable" rotation speed, the clothes may be lifted from the lower portion of the drum 130 to an upper portion of the drum 130 along the inner wall of the drum 130 and after this, may fall to the lower portion of the drum 130 due to the gravity. This may increase fluctuations in load of the drum motor 141 and fluctuations in the q-axis current command Iq* of the driving circuit 200 may increase accordingly.

Furthermore, as the fluctuations in the q-axis current command Iq* of the driving circuit 200 increases, the rotation speed of the drum 130 may fluctuate. In other words, the rotation speed of the drum 130 may fluctuate in a certain range with the center set to the "suitable" rotation speed.

When the rotation speed of the drum 130 reaches a maximum speed within the certain range, the clothes may be rotated along with the drum 130 while stuck to the inner wall of the drum 130. Due to the increase in rotation speed, the driving circuit 200 may reduce the q-axis current command Iq*, so that the rotation speed of the drum 130 may be reduced in the certain range.

When the rotation speed of the drum 130 reaches a minimum speed within the certain range, some of the clothes may fall to the lower portion of the drum 130 from the upper portion of the drum 130. Furthermore, some of the clothes may roll over in the lower portion of the drum 130. Due to the decrease in rotation speed, the driving circuit 200 may increase the q-axis current command Iq*, so that the rotation speed of the drum 130 may increase within the certain range.

As such, when the drum 130 is rotated to follow the "suitable" rotation speed, the q-axis current command Iq* of the driving circuit 200 fluctuates to the max.

According to "suitable" illustration in FIG. 10, the "suitable" rotation speed is the first rotation speed V1 in operation 1120, which may be about 55 rpm. However, 55 rpm is merely an example, and the suitable rotation speed may be changed according to the size and weight of the drum 130, an amount of the clothes contained in the drum 130, a type of the drum motor 141, etc. For example, the first rotation speed V1, which is the "suitable" rotation speed, may be a certain value between about 50 rpm and about 60 rpm.

As such, while the rotation speed of the drum motor 141 follows the first rotation speed V1, the driving current supplied to the drum motor 141 from the driving circuit 200, i.e., the q-axis current command Iq* of the driving circuit 200 may fluctuate to the max.

Fluctuations in the q-axis current command Iq* of the driving circuit 200 while the rotation speed of the drum motor 141 follows the first rotation speed V1 are larger than fluctuations in the q-axis current command Iq* of the driving circuit 200 while the rotation speed of the drum motor 141 follows a rotation speed lower than the first rotation speed V1. Furthermore, fluctuations in the q-axis current command Iq* of the driving circuit 200 while the rotation speed of the drum motor 141 follows the first rotation speed V1 are larger than fluctuations in the q-axis current command Iq* of the driving circuit 200 while the rotation speed of the drum motor 141 follows a rotation speed higher than the first rotation speed V1.

The first rotation speed V1 may be preset rotation speed, which may be about 50 rpm to about 60 rpm. It is more desirable that the first rotation speed V1 may be about 55 rpm.

While the rotation speed of the drum motor 141 follows the first rotation speed V1, the washer 100 detects a first current supplied to the drum motor 141 and filters the detected first current, in 1130.

While the rotation speed of the drum motor 141 follows the first rotation speed V1, the controller 190 may obtain information about a driving current to the drum motor 141 from the driving circuit 200. Specifically, the controller 190 may obtain at least one of the q-axis current command Iq* of the driving circuit 200 or the q-axis current value Iq of the drum motor 141. In other words, while the rotation speed of the drum motor 141 follows the first rotation speed V1, the controller 190 may obtain the first current including at least one of the q-axis current command Iq* of the driving circuit 200 or the q-axis current value Iq.

The controller 190 may filter the first current. The controller 190 may filter the first current to determine fluctuations in the first current (e.g., the q-axis current command or the q-axis current value). For example, the controller 190 may eliminate high-frequency components of the first current, eliminate a DC component of the first current from which the high-frequency components are eliminated, obtain an absolute value of the first current from which the high-frequency components and the DC component are eliminated, and obtain low-frequency components of the absolute value of the first current from which the high-frequency components and the DC component are eliminated.

The controller 190 may obtain an envelope of the first current to eliminate the high-frequency components of the first current. The controller 190 may perform envelope detection on the first current to detect an envelope of the first current. The controller 190 may perform high pass filtering on the first current to eliminate the DC component of the first current. Further, the controller 190 may perform full-wave rectification on the first current to obtain an absolute value of the first current.

The absolute value of a current resulting from elimination of the DC component of the envelope of the first current may represent fluctuations of the first current (hereinafter, referred to as a first current fluctuation) as shown in FIG. 11.

The controller 190 may additionally filter the absolute value of the first current with the high-frequency components and the DC component eliminated therefrom, to determine a range of the first current fluctuation (hereinafter, referred to as a first current fluctuating magnitude). For example, the controller 190 may perform low pass filtering on the absolute value of the first current to obtain low-frequency components of the absolute value of the first current.

The filtered first current may represent the first current fluctuation as shown in FIG. 12.

As such, the controller 190 may obtain the first current fluctuating magnitude by performing filtering on the first current.

Filtering of the first current is not, however, limited thereto, and various signal processing technologies for detecting the first current fluctuating magnitude may be used. For example, the filtering of the first current may include obtaining an envelope of the first current, eliminating a DC component of the envelope of the first current, and obtain an absolute value of the envelope of the first current with the DC component eliminated therefrom. The filtering of the first current may include eliminating a DC component of the first current, obtaining an absolute value of the first current with the DC component eliminated therefrom, and obtaining low-frequency components of the absolute value of the first current with the DC component eliminated therefrom. Furthermore, the filtering of the first current may include eliminating high-frequency components and a DC component of the first current, obtaining an absolute value of the first current with the high-frequency components and the DC component eliminated therefrom, and obtaining low-frequency components of the absolute value of the first current.

The washer 100 determines whether a gradient of the first current fluctuating magnitude (or changing rate) is equal to or less than a reference gradient (or reference changing rate) having a negative value, in 1140. The gradient of the first current fluctuating magnitude may represent changes in first current fluctuating magnitude obtained for a preset period of time.

While the rotation speed of the drum motor 141 follows the first rotation speed V1, the controller 190 may obtain the first current from the driving circuit 200 and perform filtering on the first current.

The controller 190 may determine a gradient (or changing rate) of the first current fluctuating magnitude. The controller 190 may sample the first current fluctuating magnitude at every preset time. The controller 190 may determine the changing rate of the filtered first current fluctuating magnitude based on a difference between the sampled first current fluctuating magnitudes. For example, as shown in FIG. 12, a first current fluctuating magnitude I1 may be obtained at time T7a and a first current fluctuating magnitude I2 may be obtained at time T7b. The controller 190 may obtain a gradient S of the first current fluctuating magnitude as described in Equation (3), below.

$$S = \frac{I_2 - I_1}{T_{7b} - T_{7a}} \quad (3)$$

Here, S indicates a gradient of the first current fluctuating magnitude.

The gradient of the first current fluctuating magnitude represents a positive value while the first current fluctuating magnitude increases, and the gradient of the first current fluctuating magnitude represents a negative value while the first current fluctuating magnitude decreases.

Hence, the controller 190 may determine that the fluctuation of the first current increases when the gradient of the first current fluctuating magnitude has a positive (+) value. The increase in the fluctuation of the first current may represent an increase in vibration width of the drum 130 and an increase in fluctuating magnitude of the load of the drum motor 141. When the clothes having been rotated along with the drum 130 while stuck to the inner wall of the drum 130 are separated from the inner wall of the drum 130 and fall from an upper portion of the drum 130 to the lower portion of the drum 130, the vibration width of the drum 130 may increase and the fluctuating magnitude of the load of the drum motor 141 may increase. As such, an increase in first current fluctuation may mean an increase in motion of the clothes in the drum 130.

With the increase in motion of the clothes in the drum 130, the clothes may be separated from the inner wall of the drum 130 and gathered in the lower portion of the drum 130, as shown in FIG. 9B. When the rotation speed of the drum 130 increases while the clothes are gathered in the lower portion of the drum 130, the clothes may be spread unevenly in the drum 130, so the unbalance of the clothes in the drum 130 may increase.

On the other hand, when the gradient of the first current fluctuating magnitude has a negative (+) value, the controller 190 may determine that the fluctuation of the first current decreases. The decrease in the fluctuation of the first current may represent a decrease in vibration width of the drum 130 and a decrease in fluctuating magnitude of the load of the drum motor 141. When the clothes falling from an upper portion of the drum 130 toward a lower portion of the drum 130 are stuck to the inner wall of the drum 130 and rotated along with the drum 130, the vibration width of the drum 130 may decrease and the fluctuating magnitude of the load of the drum motor 141 may decrease. As such, a decrease in first current fluctuation may mean a decrease in motion of the clothes in the drum 130.

With the decrease in motion of the clothes in the drum 130, the clothes may be stuck to the inner wall of the drum 130 and may start to rotate along with the drum 130, as shown in FIG. 9B. When the rotation speed of the drum 130 increases while the clothes are stuck to the inner wall of the drum 130, the clothes may be spread relatively evenly in the drum 130, so the unbalance of the clothes in the drum 130 may decrease.

The controller 190 may determine whether the gradient of the first current fluctuating magnitude has a negative (−) value, to reduce the unbalance of the clothes in the drum 130.

In certain embodiments, the controller 190 may compare the gradient of the first current fluctuating magnitude (or changing rate) with a reference gradient (changing rate), and determine whether the gradient of the first current fluctuating magnitude (or changing rate) is equal to or less than the reference gradient (changing rate).

The reference gradient (or reference changing rate) may represent a negative (−) value. Furthermore, the reference gradient is an index indicating a decrease in first current fluctuating magnitude, which may be set experimentally or empirically.

When the gradient of the first current fluctuating magnitude is not equal to or less than the reference gradient having a negative value (no) in 1140, the washer 100 may repeat detecting the first current supplied to the drum motor 141, filtering the detected first current and determining whether the gradient of the filtered first current fluctuating magnitude is equal to or less than the reference gradient having the negative value.

When the gradient of the first current fluctuating magnitude is equal to or less than the reference gradient having the negative value (yes) in 1140, the washer 100 increases the rotation speed of the drum 130 to a second rotation speed V2 in 1150.

When the gradient of the first current fluctuating magnitude is equal to or less than the reference gradient having the negative value, it may be determined that the unbalance of the clothes in the drum 130 is within an acceptable range.

To determine whether vibrations of the drum 130 and the tub 120 due to the unbalance of the clothes in the drum 130 are within an acceptable range, the controller 190 may control the driving circuit 200 to increase the rotation speed of the drum motor 141 to the second rotation speed V2. For example, as shown in FIG. 12, the rotation speed of the drum 130 may increase at time T7 when the gradient of the filtered first current is equal to or less than the reference gradient.

In response to the rotation speed of the drum motor 141 reaching the second rotation speed V2, the controller 190 may control the driving circuit 200 to maintain the rotation speed of the drum motor 141 at the second rotation speed V2.

Under the control of the controller 190, the rotation speed of the drum motor 141 and the drum 130 may increase as shown in FIG. 8. Furthermore, the rotation speed of the drum motor 141 and the drum 130 may increase from the first rotation speed V1 at time T2 and reach the second rotation speed V2 at time T3. The drum motor 141 and the drum 130 may then remain at the second rotation speed V2.

The second rotation speed V2 may be set to determine the unbalance of clothes in the drum 130.

As described above, when the rotation speed of the drum 130 is equal to or higher than a certain speed (e.g., 65 rpm), the clothes may be laid along the inner wall of the drum 130 due to centrifugal force applied to the clothes.

When the clothes are spread evenly along the inner wall of the drum 130, a center axis of weight of the drum 130 may correspond to a line extending from the shaft 141a of the drum motor 141. This may minimize vibration of the drum 130 during the rotation of the drum 130 and also minimize vibration of the tub 120 caused by the vibration of the drum 130.

On the contrary, when the clothes are not spread evenly along the inner wall of the drum 130, the center axis of weight of the drum 130 may deviate from the line extending from the shaft 141a of the drum motor 141. This may cause the drum 130 to be eccentrically rotated, leading to vibration of the drum 130. Due to the vibration of the drum 130, the tub 120 may also vibrate.

In certain embodiments, when the drum 130 is rotated at high speed of 1000 rpm or higher, the drum 130 and the tub 120 may vibrate significantly even with a little unbalance of the clothes. The vibration of the drum 130 and the tub 120 may cause noise in particular, and further cause the tub 120 to collide with the cabinet 101.

To prevent this, the controller 190 may determine the unbalance of the clothes at the second rotation speed V2. The second rotation speed V2 may be set to a rotation speed at which the clothes may be rotated along with the drum 130 while stuck to the inner wall of the drum 130 to determine vibrations of the drum 130 and the tub 120 due to an unbalance of the clothes when the drum 130 is rotated at high speed of 1000 rpm or higher. Furthermore, the second rotation speed V2 may be set to a rotation speed at which the tub 120 may not collide with the cabinet due to vibrations of the drum 130 even when there is an unbalance of the clothes.

For example, the second rotation speed V2 may be set to about 100 rpm. However, 100 rpm is merely an example, and the second rotation speed may be changed according to the size and weight of the drum 130, an amount of the clothes contained in the drum 130, a type of the drum motor 141, etc. For example, the second rotation speed V2 may have a certain value between 75 rpm and 150 rpm.

While the rotation speed of the drum motor 141 follows the second rotation speed V2, the washer 100 detects a second current supplied to the drum motor 141 and filters the detected second current, in 1160.

While the rotation speed of the drum motor 141 follows the second rotation speed V2, the controller 190 may obtain information about a driving current to the drum motor 141 from the driving circuit 200. Specifically, the controller 190 may obtain at least one of the q-axis current command Iq* of the driving circuit 200 or the q-axis current value Iq of the drum motor 141. In other words, while the rotation speed of the drum motor 141 follows the second rotation speed, the controller 190 may obtain the second current including at least one of the q-axis current command Iq* of the driving circuit 200 or the q-axis current value Iq.

The controller 190 may filter the second current. The controller 190 may filter the second current to determine fluctuations in the second current (e.g., the q-axis current command or the q-axis current value). For example, the controller 190 may obtain an envelope of the second current, eliminate a DC component of the envelope of the second current, obtain an absolute value of the envelope of the second current with the DC component eliminated therefrom, and obtain low-frequency components of the absolute value of the envelope of the second current with the DC component eliminated therefrom.

The filtered second current may represent a fluctuating magnitude of the second current (hereinafter, referred to as a second current fluctuating magnitude). As such, the controller 190 may obtain the second current fluctuating magnitude by performing filtering on the second current.

The filtering of the second current is not, however, limited thereto. For example, the filtering of the second current may include obtaining an envelope of the second current, eliminating a DC component of the envelope of the second current, and obtaining an absolute value of the second current with the DC component eliminated therefrom. The filtering of the second current may include eliminating a DC component of the second current, obtaining an absolute value of the second current with the DC component eliminated therefrom, and obtaining low-frequency components of the absolute value of the second current with the DC component eliminated therefrom. Furthermore, the filtering of the second current may include eliminating high-frequency components and a DC component of the second current, obtaining an absolute value of the second current with the high-frequency components and the DC component eliminated therefrom, and obtaining low-frequency components of the absolute value of the second current.

The washer 100 determines whether the second current fluctuating magnitude is equal to or less than a reference fluctuating magnitude, in 1170.

While the rotation speed of the drum motor 141 follows the second rotation speed V2, the controller 190 may obtain the second current from the driving circuit 200 and perform filtering on the second current.

The controller 190 may determine the second current fluctuating magnitude. For example, the controller 190 may determine the second current fluctuating magnitude based on changes in magnitude of the filtered second current. Furthermore, the controller 190 may compare the second current fluctuating magnitude with a preset reference fluctuating magnitude and determine whether the second current fluctuating magnitude is equal to or less than the reference fluctuating magnitude.

The reference fluctuating magnitude is an index indicating fluctuations of the second current, which may be set experimentally or empirically. In certain embodiments, the reference fluctuating magnitude may be set by taking into account not only vibrations of the drum 130 and the tub 120 at the second rotation speed V2 but also vibrations of the drum 130 and the tub 120 at third rotation speed V3.

When the second current fluctuating magnitude is not equal to or less than the reference fluctuating magnitude (no) in 1170, the washer 100 reduces the rotation speed of the drum 130 to the first rotation speed V1 in 1175.

When the second current fluctuating magnitude exceeds the reference fluctuating magnitude while the rotation speed of the drum 130 increases, an unbalance of the clothes contained in the drum 130 may be determined. Furthermore, when the drum 130 is rotated at high speed for dehydrating the clothes, it may be determined that vibrations of the drum 130 and the tub 120 would go beyond an acceptable range.

Hence, the controller 190 may reduce the rotation speed of the drum 130 to the first rotation speed V1 to rearrange the clothes in the drum 130. For example, as shown in FIG. 13, the rotation speed of the drum 130 may decrease from the second rotation speed V2 at time T8 and reach the first rotation speed V1 at time T9.

While the rotation speed of the drum 130 follows the first rotation speed V1, the controller 190 may detect the first current and filter the detected first current. In response to a gradient of the first current fluctuating magnitude being equal to or less than a reference gradient, the controller 190 may increase the rotation speed of the drum 130 back to the second rotation speed V2. Subsequently, while the rotation speed of the drum 130 follows the second rotation speed V2, the controller 190 may detect the second current and filter the detected second current. The controller 190 may determine again whether the second current fluctuating magnitude is equal to or less than the reference fluctuating magnitude.

When the second current fluctuating magnitude is equal to or less than the reference fluctuating magnitude (yes) in 1170, the washer 100 increases the rotation speed of the drum 130 to the third rotation speed V3 in 1180.

When the second current fluctuating magnitude is equal to or less than the reference fluctuating magnitude, it may be determined that vibrations of the drum 130 and the tub 120 are within an allowable range even when the drum 130 is rotated at high-speed.

To separate water from the clothes, the controller 190 may control the driving circuit 200 to increase the rotation speed of the drum motor 141 to the third rotation speed V3. In response to the rotation speed of the drum motor 141 reaching the third rotation speed V3, the controller 190 may control the driving circuit 200 to maintain the rotation speed of the drum motor 141 at the third rotation speed V3 for a preset period of time.

Under the control of the controller 190, the rotation speed of the drum motor 141 and the drum 130 may increase as shown in FIG. 8. Furthermore, the rotation speed of the drum motor 141 and the drum 130 may increase from the second rotation speed V2 at time T4 and reach the third rotation speed V3 at time T5. The drum motor 141 and the drum 130 may then remain at the third rotation speed V3.

The third rotation speed V3 may be set to dehydrate the clothes in the drum 130. For example, to dehydrate the clothes, the drum 130 may be rotated at rotation speed of 1000 rpm or higher. However, 1000 rpm is merely an example, and the third rotation speed may be changed according to the size and weight of the drum 130, an amount of the clothes contained in the drum 130, a type of the drum motor 141, etc. The third rotation speed V3 may be set to a rotation speed exceeding 1000 rpm.

The washer 100 reduces the rotation speed of the drum 130 and terminates rotation of the drum 130, in 1190.

To terminate the dehydrating operation after a time preset by the user for dehydration elapses, the controller 190 may control the driving circuit 200 to terminate rotation of the drum 130 by reducing the rotation speed of the drum 130.

When the intermediate dehydrating 1015 of the washing course 1010 is completed, the controller 190 may start the rinsing course 1020, and when the intermediate dehydrating 1024 of the rinsing course 1020 is stopped, the controller 190 may start another rinsing course 1020. When the final dehydrating 1031 of the dehydrating course 1030 is completed, the controller 190 may terminate the operation of the washer 100.

As described above, during the dehydration, the washer 100 may increase the rotation speed of the drum 130 based on changes (a gradient) in fluctuating magnitude of the driving current supplied to the drum motor 141 while the rotation speed of the drum 130 follows the first rotation speed V1. Furthermore, the washer 100 may reduce or increase the rotation speed of the drum 130 based on the fluctuating magnitude of the driving current supplied to the drum motor 141 while the rotation speed of the drum 130 follows the second rotation speed V2.

As such, the washer 100 may make the clothes in the drum 130 evenly spread on the inner wall of the drum 130 while the rotation speed of the drum 130 follows the first rotation speed V1, and determine the unbalance of the clothes in the drum 130 while the rotation speed of the drum 130 follows the second rotation speed V2.

By spreading the clothes in the drum 130 evenly on the inner wall of the drum 130, vibrations of the drum 130 and the tub 120 due to the unbalance of the clothes in the drum 130 may be reduced.

Referring to FIG. 10 that illustrates fluctuations in driving current while a drum of another washer is rotating at the second rotation speed and fluctuations in driving current while the drum 130 of the washer 100 according to an embodiment is rotating at the second rotation speed, it is seen that a fluctuating magnitude of the driving current of the washer 100 according to the embodiment is reduced by about 45% as compared to the fluctuating magnitude of the driving current of the other washer. In other words, it is seen that the unbalance of clothes contained in the drum 130 of the washer 100 according to the embodiment is reduced as compared to the unbalance of clothes contained in the drum of the other washer.

Hence, the number of times of terminating the dehydrating operation for relocating the clothes during the dehydrating operation may be reduced, and the entire operation time of the washer 100 may be reduced.

Figure 15:
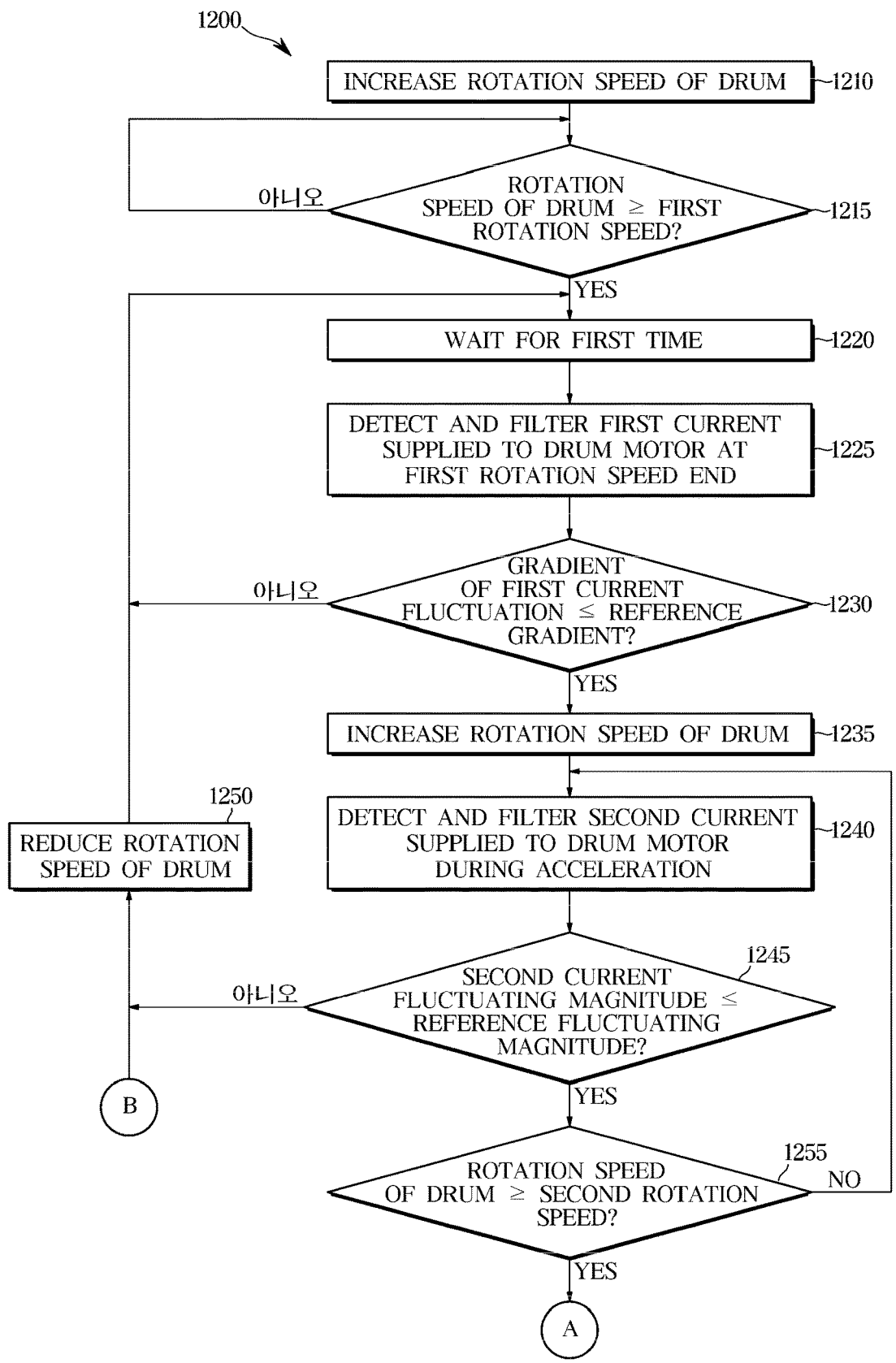
FIGS. 15 and 16 illustrate an example of a dehydrating operation of a washer, according to an embodiment.
Figure 16:
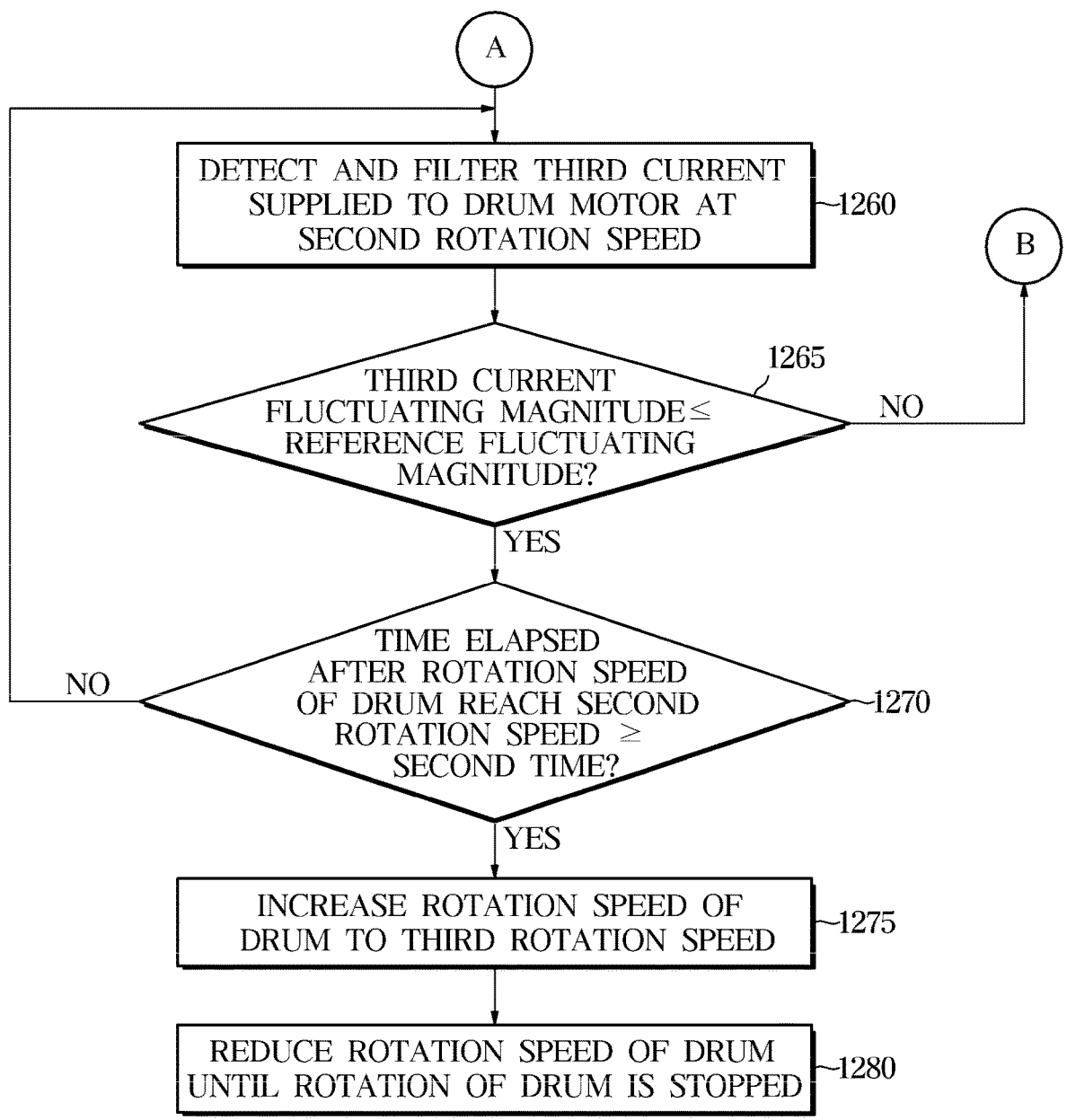
Figure 17:
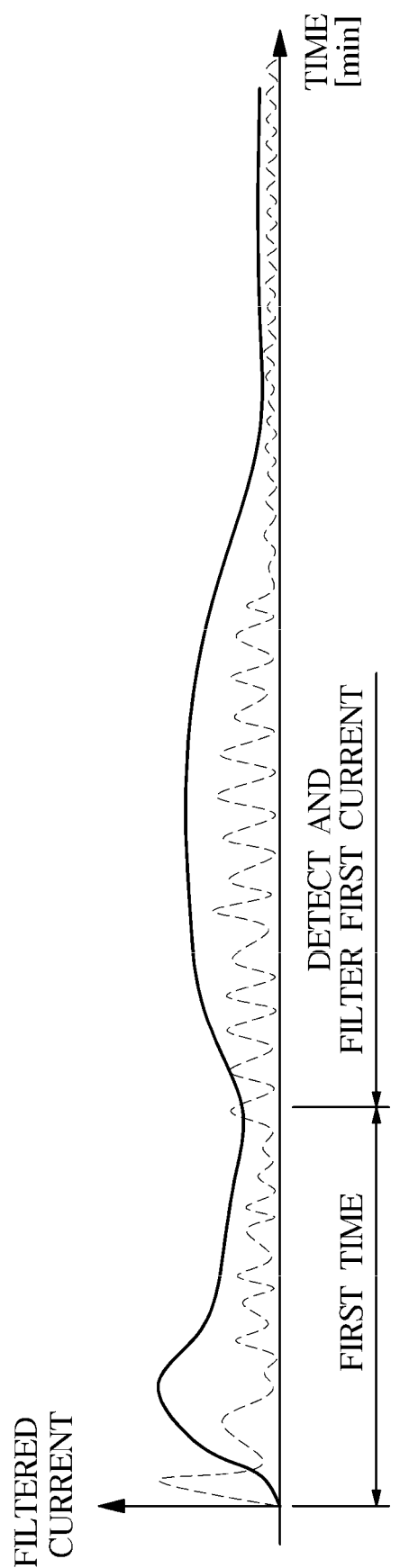
FIG. 17 illustrates fluctuations in filtered driving current of a drum motor during dehydration of a washer, according to an embodiment.
Figure 18:
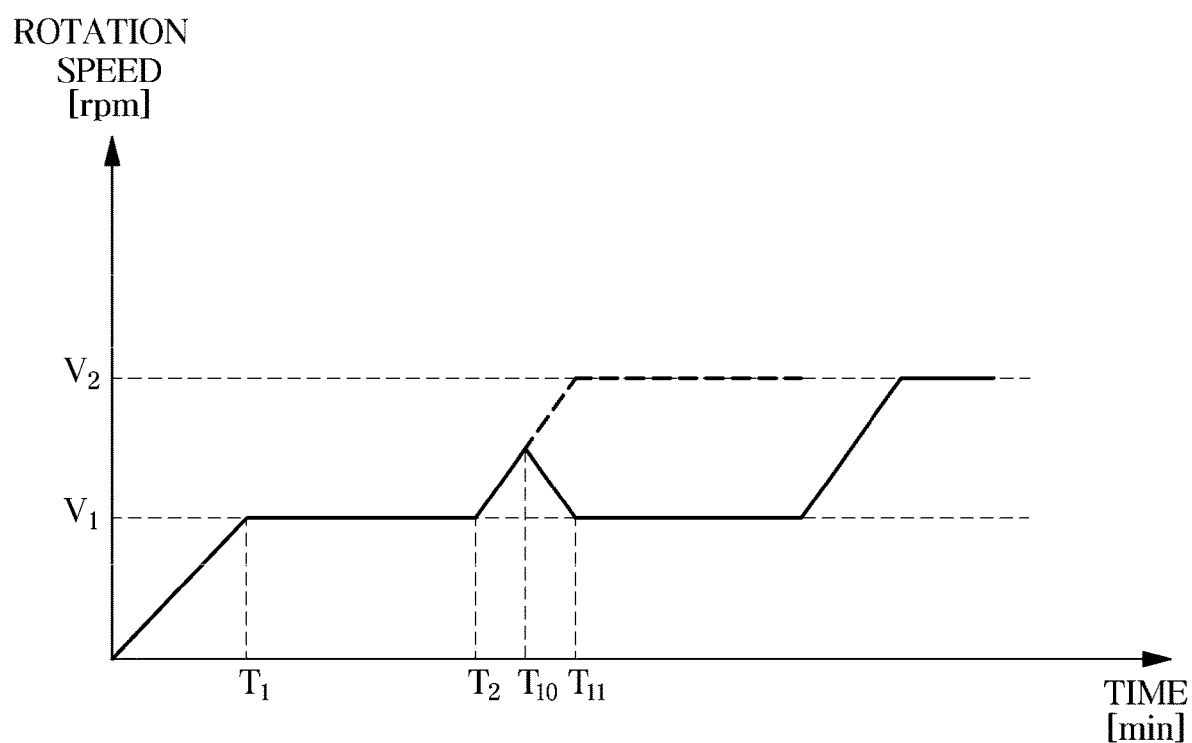
FIG. 18 illustrates changes in rotation speed of a drum during dehydration of a washer, according to an embodiment.

FIGS. 15 and 16 illustrate an example of a dehydrating operation of a washer, according to an embodiment. FIG. 17 illustrates fluctuations in filtered driving current of a drum motor during dehydration of a washer, according to an embodiment. FIG. 18 illustrates changes in rotation speed of a drum during dehydration of a washer, according to an embodiment.

FIGS. 15-18 describe the a dehydrating operation 1200 of the washer 100.

The washer 100 increases the rotation speed of the drum 130, in 1210.

When completion of the draining 1014 of the washing course 1010 and/or the draining 1023 of the rinsing course 1020 is identified, the controller 190 may control the driving circuit 200 to rotate the drum 130 and increase the rotation speed.

The washer 100 determines whether the rotation speed of the drum 130 is equal to or higher than the first rotation speed V1, in 1215.

The first rotation speed V1 may be set experimentally or empirically. When the rotation speed of the drum motor 141 increases to the first rotation speed V1 from a rotation speed lower than the first rotation speed V1, fluctuations in driving current supplied to the drum motor 141 may increase rapidly. Furthermore, when the rotation speed of the drum motor 141 increases to a higher rotation speed from the first rotation speed V1, fluctuations in driving current supplied to the drum motor 141 may decrease rapidly.

For example, the controller 190 may provide a rotation speed command ω* to the driving circuit 200 to gradually increase the rotation speed of the drum motor 141 until the rotation speed of the drum motor 141 reaches the first rotation speed V1. The controller 190 may determine whether the rotation speed of the drum 130 has reached the first rotation speed V1 based on the rotation speed command ω* provided to the driving circuit 200.

In another example, the controller 190 may obtain information about the rotation speed of the drum motor 141 from the driving circuit 200 or determine the rotation speed of the drum motor 141 from an output of the position sensor 270. The controller 190 may determine whether the rotation speed of the drum 130 reaches the first rotation speed V1 based on comparison between the rotation speed of the drum motor 141 and the first rotation speed V1.

When the rotation speed of the drum 130 is not equal to or higher than the first rotation speed V1 (no) in 1215, the washer 100 keeps increasing the rotation speed of the drum 130.

When the rotation speed of the drum 130 is equal to or higher than the first rotation speed V1 (yes) in 1215, the washer 100 waits for a preset first time after the rotation speed of the drum 130 reaches the first rotation speed V1, in 1220.

As the rotation speed of the drum 130 increases, the motion of the clothes in the drum 130 increases and the fluctuating magnitude of the driving current supplied to the drum 130 also increases.

When the rotation speed of the drum 130 reaches the first rotation speed V1 and stays at the first rotation speed V1, the motion of the clothes in the drum 130 may be reduced for a while and the fluctuating magnitude of the driving current supplied to the drum 130 may also be reduced.

As such, the washer 100 may wait for the preset first time after the first rotation speed V1 is reached (or a dehydrating operation is started) to distinguish a reduction in fluctuating magnitude of the driving current due to arrangement of the clothes in the drum 130 from a reduction in motion of the clothes in the drum 130 due to a reduction in rotation acceleration of the drum 130.

While the rotation speed of the drum motor 141 follows the first rotation speed V1, the washer 100 detects and filters a first current supplied to the drum motor 141, in 1225.

The operation 1225 may be the same as the operation 1130 described in connection with FIG. 7.

For example, while the rotation speed of the drum motor 141 follows the first rotation speed V1, the controller 190 may obtain the first current including at least one of the q-axis current command Iq* of the driving circuit 200 or the q-axis current value Iq, and filter the first current. For example, the controller 190 may obtain an envelope of the first current, eliminate a DC component of the envelope of the first current, obtain an absolute value of the envelope of the first current with the DC component eliminated therefrom, and obtain low-frequency components of the absolute value of the envelope of the first current. Filtering of the first current is not, however, limited thereto, and various signal processing technologies for detecting the first current fluctuating magnitude may be used.

The washer 100 determines whether a gradient of the fluctuating magnitude of the filtered first current (hereinafter, referred to as the first current fluctuating magnitude) is equal to or less than a reference gradient, in 1230.

The operation 1230 may be the same as the operation 1140 described in connection with FIG. 7.

For example, the controller 190 may determine a gradient of the first current fluctuating magnitude based on a difference between a first current fluctuating magnitude sampled for the n-th time and a first current fluctuating magnitude sampled for the (n+1)-th time, and determine whether the gradient of the first current fluctuating magnitude is equal to or less than the reference gradient having a negative value based on comparison between the gradient of the first current fluctuating magnitude and the reference gradient.

When the gradient of the first current fluctuating magnitude is not equal to or less than the reference gradient (no) in 1230, the washer 100 may repeat detecting the first current supplied to the drum motor 141, filtering the detected first current and determining whether the gradient of the first current fluctuating magnitude is equal to or less than the reference gradient.

When the gradient of the first current is equal to or less than the reference gradient (yes) in 1230, the washer 100 increases the rotation speed of the drum 130, in 1235.

When it is identified that the first current gradient is equal to or less than the reference gradient, the controller 190 may control the driving circuit 200 to rotate the drum 130 and increase the rotation speed.

While the rotation speed of the drum motor 141 increases, the washer 100 detects and filters a second current supplied to the drum motor 141, in 1240.

The operation 1240 may be the same as the operation 1160 described in connection with FIG. 7.

For example, while the rotation speed of the drum motor 141 increases, the controller 190 may obtain the second current including at least one of the q-axis current command Iq* of the driving circuit 200 or the q-axis current value Iq, and filter the second current. Filtering the second current may include obtaining an envelope of the second current, eliminate a DC component of the envelope of the second current, obtain an absolute value of the envelope of the second current with the DC component eliminated therefrom, and obtain low-frequency components of the absolute value of the envelope of the second current. Filtering the first current is not limited thereto, and various signal processing technologies for detecting the second current fluctuating magnitude may be used.

The washer 100 determines whether a fluctuating magnitude of the filtered second current (hereinafter, referred to as the second current fluctuating magnitude) is equal to or less than a reference fluctuating magnitude, in 1245.

The operation 1245 may be the same as the operation 1170 of FIG. 7.

For example, the controller 190 may determine whether the second current fluctuating magnitude is equal to or less than a reference fluctuating magnitude based on comparison between the second current fluctuating magnitude and the reference fluctuating magnitude.

When the second current fluctuating magnitude is not equal to or less than the reference fluctuating magnitude (no) in 1245, the washer 100 decreases the rotation speed of the drum 130 to the first rotation speed V1 in 1250.

When the second current fluctuating magnitude exceeds the reference fluctuating magnitude while the rotation speed of the drum 130 increases, unbalance of the clothes contained in the drum 130 may be determined. Hence, the controller 190 may decrease the rotation speed of the drum 130 to the first rotation speed V1 to rearrange the clothes in the drum 130. For example, as shown in FIG. 18, the rotation speed of the drum 130 may decrease at time T10 and reach the first rotation speed V1 at time T11.

Subsequently, the controller 190 may detect and filter the first current, and increase the rotation speed of the drum 130 again based on a gradient of the first current fluctuating magnitude.

When the second current fluctuating magnitude is equal to or less than the reference fluctuating magnitude (yes) in 1250, the washer 100 determines whether the rotation speed of the drum 130 is equal to or higher than the second rotation speed V2 in 1255.

The second rotation speed V2 may be set experimentally or empirically. The second rotation speed V2 may be set to determine an unbalance of clothes in the drum 130 before the drum 130 is rotated at high speed. For example, the second rotation speed V2 may be set to about 100 rpm.

When the rotation speed of the drum 130 is not equal to or higher than the second rotation speed V2 (no) in 1255, the washer 100 continues to detect the second current supplied to the drum motor 141, filter the detected second current, and determine whether the second current fluctuating magnitude is equal to or less than the reference fluctuating magnitude, while increasing the rotation speed of the drum 130.

When the rotation speed of the drum 130 is equal to or higher than the second rotation speed V2 (yes) in 1255, the washer 100 detects and filters a third current supplied to the drum motor 141, in 1260.

The operation 1260 may be the same as the operation 1240.

Furthermore, the washer 100 determines whether a fluctuating magnitude of the filtered third current (hereinafter, referred to as the third current fluctuating magnitude) is equal to or less than a reference fluctuating magnitude, in 1265.

The operation 1265 may be the same as the operation 1245.

The washer 100 determines whether a second time or more elapses after the rotation speed of the drum 130 reaches the second rotation speed V2, in 1270.

The controller 190 may count the time that elapses after the rotation speed of the drum 130 reaches the second rotation speed V2, and compare the counted time with a preset second time. The controller 190 may determine whether the counted time is equal to or more than the second time based on the comparing between the counted time and the second time.

The second time is a time to determine an unbalance of clothes in the drum 130, which may be set experimentally or empirically.

When the time that elapses after the rotation speed of the drum 130 reaches the second rotation speed V2 is not equal to or more than the second time (no) in 1270, the washer 100 continues to detect the third current supplied to the drum motor 141, filter the detected third current, and determine whether the third current fluctuating magnitude is equal to or less than the reference fluctuating magnitude, while the rotation speed of the drum 130 follows the second rotation speed V2.

When the time that elapses after the rotation speed of the drum 130 reaches the second rotation speed V2 is equal to or more than the second time (yes) in 1270, the washer 100 increases the rotation speed of the drum 130 to the third rotation speed V3, in 1275.

The operation 1275 may be the same as the operation 1180 of FIG. 7.

To dehydrate the clothes, the controller 190 may control the driving circuit 200 to increase the rotation speed of the drum motor 141, and control the driving circuit 200 to maintain the rotation speed of the drum motor 141 at the third rotation speed V3 for a preset period of time.

The washer 100 reduces the rotation speed of the drum 130 and terminates rotation of the drum 130, in 1280.

To terminate the dehydrating operation after a time preset by the user for dehydration elapses, the controller 190 may control the driving circuit 200 to terminate rotation of the drum 130 by reducing the rotation speed of the drum 130.

According to the dehydrating operation 1200 as described above, the washer 100 may make the clothes in the drum 130 evenly spread on the inner wall of the drum 130 while the rotation speed of the drum 130 follows the first rotation speed V1. Furthermore, the washer 100 may increase the rotation speed of the drum 130 to the second rotation speed V2, and determine an unbalance of the clothes in the drum 130 while the rotation speed of the drum 130 follows the second rotation speed V2.

By spreading the clothes in the drum 130 evenly on the inner wall of the drum 130, vibrations of the drum 130 and the tub 120 due to the unbalance of the clothes in the drum 130 may be reduced, and the entire operation time of the washer 100 may also be reduced.

Figure 19:
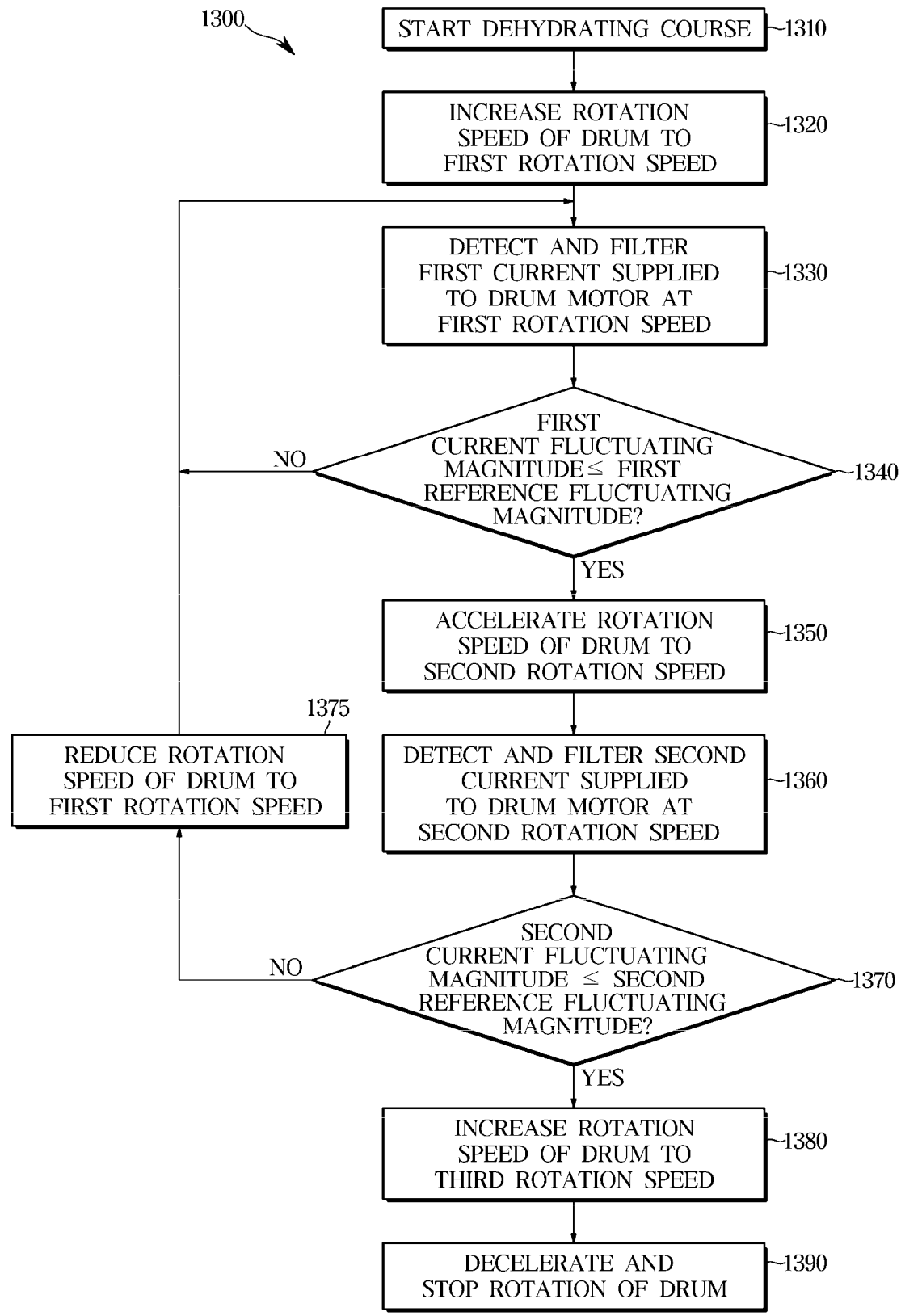
FIG. 19 illustrates an example of a dehydrating operation of a washer, according to an embodiment.

FIG. 19 illustrates an example of a dehydrating operation of a washer, according to an embodiment.

A dehydrating operation 1300 of the washer 100 is described in connection with FIG. 19.

The washer 100 starts dehydrating in 1310 and increases the rotation speed of the drum 130 to the first rotation speed V1 in 1320.

The operations 1310 and 1320 may be the same as the operations 1110 and 1120 shown in FIG. 7, respectively.

While the rotation speed of the drum motor 141 follows the first rotation speed V1, the washer 100 detects the first current supplied to the drum motor 141 and filters the detected first current, in 1330.

The controller 190 may filter the first current. The controller 190 may filter the first current to determine a change in the first current (e.g., the q-axis current command or the q-axis current value). For example, the controller 190 may obtain an envelope of the first current, eliminate a DC component of the envelope of the first current, obtain an absolute value of the envelope of the first current with the DC component eliminated therefrom, and obtain low-frequency components of the absolute value of the envelope of the first current.

The washer 100 determines whether a fluctuating magnitude of the filtered first current (hereinafter, referred to as the first current fluctuating magnitude) is equal to or less than a first reference fluctuating magnitude, in 1340.

The controller 190 may determine the first current fluctuating magnitude. For example, the controller 190 may determine the first current fluctuating magnitude based on the magnitude of the filtered first current. Furthermore, the controller 190 may compare the first current fluctuating magnitude with a reference fluctuating magnitude and determine whether the first current fluctuating magnitude is equal to or less than the first reference fluctuating magnitude.

The first reference fluctuating magnitude is an index indicating fluctuations of the first current, which may be set experimentally or empirically.

When the first current fluctuating magnitude is not equal to or less than the first reference fluctuating magnitude (no) in 1340, the washer 100 may repeat detecting the first current supplied to the drum motor 141, filtering the detected first current and determining whether the first current fluctuating magnitude is equal to or less than the first reference fluctuating magnitude.

When the first current fluctuating magnitude is equal to or less than the first reference fluctuating magnitude (yes) in 1340, the washer 100 increases the rotation speed of the drum 130 to the second rotation speed V2 in 1350, and the washer 100 detects a second current supplied to the drum motor 141 and filters the detected second current in 1360 while the rotation speed of the drum motor 141 follows the second rotation speed V2.

The operations 1350 and 1360 may be the same as the operations 1150 and 1160 described in connection with FIG. 7, respectively.

The washer 100 determines whether a fluctuating magnitude of the filtered second current (hereinafter, referred to as the second current fluctuating magnitude) is equal to or less than a second reference fluctuating magnitude in 1370, and when the second current fluctuating magnitude is not equal to or less than the second reference fluctuating magnitude (no) in 1370, the washer 100 reduces the rotation speed of the drum 130 to the first rotation speed V1 in 1375.

The operations 1370 and 1375 may be the same as the operations 1170 and 1175 described in connection with FIG. 7, respectively.

When the second current fluctuating magnitude is equal to or less than the second reference fluctuating magnitude (yes) in 1370, the washer 100 increases the rotation speed of the drum 130 to the third rotation speed V3 in 1380, and then reduces the rotation speed of the drum 130 and terminates rotation of the drum 130, in 1390.

The operations 1380 and 1390 may be the same as the operations 1180 and 1190 described in connection with FIG. 7, respectively.

According to the dehydrating operation 1200 as described above, the washer 100 may determine an unbalance of the clothes while the rotation speed of the drum 130 follows the first rotation speed V1, and determine an unbalance of the clothes while the rotation speed of the drum 130 follows the second rotation speed V2.

As such, by determining an unbalance of the clothes multiple times, vibrations of the drum 130 and the tub 120 due to the unbalance of the clothes in the drum 130 may be reduced, and the entire operation time of the washer 100 may also be reduced.

The washer includes a drum; a drum motor coupled to the drum; a driving circuit configured to supply a driving current to the drum motor to rotate the drum motor; and a controller electrically coupled to the driving circuit, wherein the controller is configured to control the driving circuit to accelerate the drum motor to a second rotation speed based on a gradient of a fluctuating magnitude of a driving current supplied to the drum motor while controlling the driving circuit to rotate the drum motor at a first rotation speed. The controller may obtain the gradient of the fluctuating magnitude of the driving current based on a difference between fluctuating magnitudes of the driving current obtained at every preset time while controlling the driving circuit to rotate the drum motor at the first rotation speed. The first rotation speed may have a value between 50 rpm and 60 rpm.

Accordingly, the washer may uniformly rearrange the clothes along the inner wall of the drum while the drum is rotating at the first rotation speed, reducing the unbalance of the clothes. Furthermore, the washer may reduce vibrations of the drum and the tub during dehydration, and reduce the operating time.

The controller may control the driving circuit to rotate the drum motor at a first rotation speed for a variable time based on changes in fluctuating magnitude of the driving current.

The controller may control the driving circuit to accelerate the drum motor to a second rotation speed based on a gradient of a fluctuating magnitude of the driving current being smaller than a reference gradient having a negative value while controlling the driving circuit to rotate the drum motor at the first rotation speed.

Accordingly, the washer may induce the motion of the clothes so that the clothes are uniformly rearranged along the inner wall of the drum while the drum is rotated at the first rotation speed.

The controller may control the driving circuit to filter the driving current while controlling the driving circuit to rotate the drum motor at the first rotation speed, and accelerate the drum motor to the second rotation speed based on a changing rate of the filtered driving current being smaller than a reference decreasing rate.

Accordingly, the washer may predict the motion of the clothes based on the changing rate of the filtered driving current, and induce the motion of the clothes so that the clothes are uniformly rearranged along the inner wall of the drum.

The controller may filter the driving current by obtaining an envelope of the driving current, eliminating a DC component of the envelope of the driving current, obtaining an absolute value of the envelope of the driving current with the DC component eliminated therefrom, and obtaining low-frequency components of the absolute value of the envelope of the driving current.

Alternatively, the controller may filter the driving current by eliminating a DC component of the driving current, obtaining an absolute value of the driving current with the DC component eliminated therefrom, and obtaining low-frequency components of the absolute value of the driving current.

Accordingly, the washer may obtain a decreasing rate of the fluctuating magnitude of the driving current and predict the motion of the clothes based on the changing rate of the fluctuating magnitude of the driving current.

In the course of accelerating the drum motor to the second rotation speed, the controller may slow down the drum motor to the first rotation speed based on a fluctuating magnitude of the driving current supplied to the drum motor.

Furthermore, in the course of controlling the driving circuit to rotate the drum motor at the second rotation speed, the controller may decelerate the drum motor to the first rotation speed based on a fluctuating magnitude of a driving current supplied to the drum motor.

Accordingly, the washer may determine whether there is an unbalance of the clothes based on the fluctuating magnitude of the driving current supplied to the drum motor at the second rotation speed. The washer may reduce the rotation speed of the drum to rearrange the clothes on the inner wall of the drum based on the determination of the unbalance of the clothes.

Meanwhile, the embodiments of the disclosure may be implemented in the form of a recording medium for storing instructions to be carried out by a computer. The instructions may be stored in the form of program codes, and when executed by a processor, may generate program modules to perform operation in the embodiments of the disclosure. The recording media may correspond to computer-readable recording media.

The computer-readable recording medium includes any type of recording medium having data stored thereon that may be thereafter read by a computer. For example, it may be a read only memory (ROM), a random access memory (RAM), a magnetic tape, a magnetic disk, a flash memory, an optical data storage device, etc.

The machine-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

In an embodiment of the disclosure, the aforementioned method according to the various embodiments of the disclosure may be provided in a computer program product. The computer program product may be a commercial product that may be traded between a seller and a buyer. The computer program product may be distributed in the form of a storage medium (e.g., a compact disc read only memory (CD-ROM)), through an application store (e.g., play Store™) directly between two user devices (e.g., smart phones), or online (e.g., downloaded or uploaded). In the case of online distribution, at least part of the computer program product (e.g., a downloadable app) may be at least temporarily stored or arbitrarily created in a storage medium that may be readable to a device such as a server of the manufacturer, a server of the application store, or a relay server.

The embodiments of the disclosure have thus far been described with reference to accompanying drawings. It will be obvious to people of ordinary skill in the art that the present disclosure may be practiced in other forms than the embodiments as described above without changing the technical idea or essential features of the present disclosure. The above embodiments are only by way of example, and should not be interpreted in a limited sense.

Although the present disclosure has been described with various embodiments, various changes and modifications may be suggested to one skilled in the art. It is intended that the present disclosure encompass such changes and modifications as fall within the scope of the appended claims.

What is claimed is:

1. A washer comprising:
    a drum;
    a drum motor coupled to the drum;
    a driving circuit configured to supply a driving current to the drum motor to rotate the drum motor at a first rotation speed; and
    a processor electrically coupled to the driving circuit,
    wherein the processor is configured to control the driving circuit to accelerate the drum motor from the first rotational speed to a second rotation speed based on a gradient of a fluctuating magnitude of the driving current supplied to the drum motor while controlling the driving circuit to rotate the drum motor at the first rotation speed; and
    decelerate the drum motor to the first rotation speed based on a fluctuating magnitude of the driving current supplied to the drum motor being larger than a reference fluctuating magnitude while accelerating the drum motor to the second rotation speed.

2. The washer of claim 1, wherein the processor is further configured to obtain the gradient of the fluctuating magnitude of the driving current based on a difference between fluctuating magnitudes of the driving current obtained at every preset time while controlling the driving circuit to rotate the drum motor at the first rotation speed.

3. The washer of claim 1, wherein the processor is further configured to control the driving circuit to accelerate the drum motor to the second rotation speed based on the gradient of the fluctuating magnitude of the driving current being smaller than a reference gradient having a negative value while controlling the driving circuit to rotate the drum motor at the first rotation speed.

4. The washer of claim 1, wherein the processor is further configured to:
    filter the driving current while controlling the driving circuit to rotate the drum motor at the first rotation speed; and
    control the driving circuit to accelerate the drum motor to the second rotation speed based on a gradient of the filtered driving current being equal to or smaller than a reference gradient having a negative value.

5. The washer of claim 4, wherein to filter the driving current, the processor is configured to:
    obtain an envelope of the driving current;
    eliminate a direct current (DC) component of the envelope of the driving current;
    obtain an absolute value of the envelope of the driving current from which the DC component is eliminated; and
    obtain low-frequency components of the absolute value of the envelope of the driving current.

6. The washer of claim 4, wherein to filter the driving current, the processor is configured to:
    eliminate a DC component of the driving current;
    obtain an absolute value of the driving current from which the DC component is eliminated; and
    obtain low-frequency components of the absolute value of the driving current.

* * * * *